United States Patent [19]

Steinbach

[11] Patent Number: 5,247,562
[45] Date of Patent: Sep. 21, 1993

[54] TUNABLE SOURCE OF MONOCHROMATIC, HIGHLY-DIRECTIONAL X-RAYS AND A METHOD FOR PRODUCING SUCH RADIATION

[75] Inventor: Arden L. Steinbach, Sudbury, Mass.

[73] Assignee: The Massachusetts Institute of Technology, Cambridge, Mass.

[21] Appl. No.: 915,476

[22] Filed: Jul. 16, 1992

[51] Int. Cl.$^5$ .............................................. H01S 3/098
[52] U.S. Cl. ....................................... 378/119; 372/5; 372/22
[58] Field of Search ............... 378/119, 120, 121, 137, 378/138; 372/5, 22, 29, 33

[56] References Cited

U.S. PATENT DOCUMENTS

| | | | |
|---|---|---|---|
| 4,598,415 | 8/1986 | Luccio | 378/119 |
| 4,646,308 | 2/1987 | Kafka et al. | 372/5 |
| 4,817,124 | 3/1989 | Kelterson et al. | 378/119 |
| 4,975,917 | 12/1990 | Villa | 372/5 |
| 5,027,361 | 6/1991 | Kozlousky et al. | 372/22 |

OTHER PUBLICATIONS

T. Shintake, K. Huke, J. Tanaka, I. Sato and I. Kumabe, "Development of Microwave Undulator," *Japan J. Appl. Phys.*, vol. 22, No. 5, pp. 844-851 (May 1983).

P. Dobiasch, P. Meystre and M. O. Scully, "Optical Wiggler Free-Electron X-Ray Laser in the 5 Å Region," *IEEE J. Quant. Electr.* V. QE-19, No. 12, pp. 1812-1820 (Dec. 1983).

J. Gea-Banacloche, G. T. Moore, R. R. Schlicher, M. O. Scully and H. Walther, "Soft X-Ray Free-Electron Laser With a Laser Undulator," *IEEE J. Quant. Electr.* vol. QE-23, No. 9, pp. 1558-1570 (Sep. 1987).

R. H. Pantell, J. Feinstein and A. H. Ho, "Interferometer Mirrors with Holes On-Axis," *Nucl. Instr. Meth. Phys. Res.* A 296, pp. 638-641 (1990).

M. Keselbrener, S. Ruschin, B. Lissak and A. Gover, "Numerical Studies of Resonators with On-Axis Holes in Mirrors for FEL Application," *Nucl. Instr. Meth. Phys. Res.* A304, pp. 782-785 (1991).

R. H. Milburn, "Electron Scattering by an Intense Polarized Photon Field," *Phys. Rev. Letters*, vol. 10, No. 3, pp. 75-77 (1963).

(List continued on next page.)

*Primary Examiner*—David P. Porta
*Attorney, Agent, or Firm*—Steven J. Weissburg

[57] ABSTRACT

In a first preferred embodiment, the invention is an apparatus for generating radiation comprising: means for generating a beam of electrons; means for constraining the beam of electrons to travel in a substantially straight path over a predetermined distance; means for generating a standing wave of light; and means for causing the beam of electrons to pass through the standing wave of light during a portion of the straight path, thereby causing certain of said electrons to emit radiation. The standing wave of light is preferably generated by a continuous wave beam of light that is circulating in a power build up cavity. In another preferred embodiment, the invention is a method of generating radiation, the method comprising the steps of: generating a beam of electrons; constraining the beam of electrons to travel in a substantially straight path over a predetermined distance; using a continuous wave beam of laser light to generate a standing wave of light; and passing the beam of electrons through the standing wave of light during a portion of the straight path, thereby causing certain of the electrons in the beam to emit radiation.

23 Claims, 6 Drawing Sheets

OTHER PUBLICATIONS

F. R. Arutyunian and V. A. Tumanian, "The Compton Effect on Relativistic Electrons and the Possibility of Obtaining High Energy Beams," *Physics Letters*, vol. 4, No. 3, pp. 176-178 (1963).

R. H. Pantell, G. Soncini, and H. E. Puthoff, "S-9-Stimulated Photon-Electron Scattering," *IEEE Journal of Quantum Electronics*, vol. QE-4, No. 11, pp. 905-907 (1968).

A. Gover, C. M. Tang and P. Sprangle, "Feasibility of dc to visible high-power conversion employing a stimulated Compton free electron laser with a waveguided $CO_2$ laser pump wave and an axial electric field," *J. App. Phys.*, vol. 53, No. 1, pp. 124-129 (1982).

J. Gea Benacloche, G. T. Moore and M. O. Scully, "Prospects for an x-ray Free-Electron Laser," *Free-Electron Generators of Coherent Radiation*, ed. C. A. Brau, S. F. Jacobs and M. O. Scully, SPIE vol. 453, Bellingham, WA, pp. 393-401 (1983).

T. Taguchi and K. Mima, "Numerical Studies of Induced Emission and Saturation of Free Electron Lasers Using a $CO_2$ Laser Wiggler," *Japanese Journal of Applied Physics*, vol. 28, No. 12, pp. L2222-L2224 (1989).

P. Sprangle, B. Hafizi, and F. Mako, "New x-ray source for lithography," *Appl. Phys. Lett.*, vol. 55, No. 24, pp. 2559-2560 (1989).

L. R. Elias, "High Power, cw, Efficient, Tunable (uv through ir) Free-Electron Laser Using Low-Energy Electron Beams," *Phys. Rev. Lett.*, vol. 42, No. 15, pp. 977-981 (1979).

TUNABLE SOURCE OF MONOCHROMATIC, HIGHLY-DIRECTIONAL X-RAYS AND A METHOD FOR PRODUCING SUCH RADIATION

U.S. GOVERNMENT INTEREST

The U.S. Government has certain rights in this invention pursuant to Contract No. F19628-90-C-0002, awarded by the United States Air Force (Electronic Systems Division), which supported some of the work that contributed to this invention.

BACKGROUND OF THE INVENTION

This invention relates generally to the field of generating very short wavelength radiation and relates specifically to a method and an apparatus for generating very short wavelength radiation which is monochromatic, highly directional and tunable throughout a region spanning multiple orders of magnitude in wavelength, or equivalently, energy.

As is well known, the ability to direct a specified beam of radiation at a particular structure allows an observer to gain information about that structure. Visible light allows the reception of information about objects, with the human visual apparatus. Illuminating a structure with other radiation, such as x-rays, having a wavelength of less than $10^{-8}$ m, can provide information about structures that are not accessible using visible light. One reason is that x-rays pass through structures that are opaque to visible light. Another reason is that x-rays are reflected by and thus allow examination of structures having some characteristic size on the order of the wavelength of the x-ray used.

For very small structures, it is necessary to be able to tune an x-ray device very precisely, in terms of the average wavelength of radiation produced. This is because, in general, radiation is useful for investigating objects having a characteristic size on the order of the wavelength of the radiation. The smaller the characteristic size, the smaller the wavelength required. Thus, the precision with which the size can be established is important. Similarly, it is important that the radiation be composed of radiation having as few different wavelengths as possible. This aspect of radiation is referred to as its "chromatic" distribution. A substantially monochromatic distribution is highly useful.

It is also useful to be able to precisely direct the radiation. This is true for many reasons. For medical uses, it is known that radiation is harmful if large amounts are applied to any one spot, but much less harmful, if at all, if small doses are applied to that spot. Therefore, it is desirable to be able to prevent regions of the body not under investigation from being exposed to radiation. Further, a highly directional beam can be transformed by optical components—such as mirrors—to produce illuminated regions of desired shape and size. Little of the radiation need be wasted by such transformations.

In addition to using radiation to observe phenomena, radiation can be used to alter structures. For instance, light energy can burn through certain substances. Precisely pinpointed radiation of the right wavelength and power can etch substrates, change local chemical compositions, such as polymerization, etc.

A preferred embodiment of the disclosed invention is a compact embodiment, that can generate photons with energies freely adjustable between roughly 20 eV and 50 KeV. Apparatus with such capabilities has not previously been available. Many potential applications for such an apparatus are summarized in Table 2.

Since the invention of the laser in 1960, methods for generating monochromatic (i.e. having a narrow spread of frequencies) beams of electromagnetic radiation at soft x-ray frequencies and higher (corresponding to photon energies $\geq 100$ ev) have been proposed by many researchers. The more extensively studied ideas include: the x-ray laser (using atomic and molecular transitions), Raymond C. Elton, *X-Ray Lasers* (Academic Press, New York, 1990); the $\gamma$-ray laser (using nuclear transitions), Gagan Gupta and Javed Husain, "Prospects of Gamma-Ray Laser Development", *Mod. Phys. Lett. B* 5, 915–922 (1991); the x-ray free electron laser (FEL), J. Gea-Banacloche, G. T. Moore, R. R. Schlicher, M. O. Scully and H. Walther, "Soft X-Ray Free-Electron Laser With a Laser Undulator", *IEEE J. Quant. Electr.* QE-23, 1558–1570 (September 1987) and Peter Dobiasch, Pierre Meystre and Marlan O. Scully, "Optical Wiggler Free-Electron X-Ray Laser in the 5 Å Region", *IEEE J. Quant. Electr.* QE-19, 1812–1820 (December 1983); channeling through crystals, J. O. R. H. Pantell, S. Datz, R. K. Klein and H. Park, "Thermal-Vibrational Amplitudes of Silicon Determined by Channeling-Radiation Measurements", *Phys. Rev. B* 44, 1992–2002 (1991) and Richard A. Carrigan, Jr. and James A. Ellison, eds., *Relativistic Channeling* (Plenum, New York, 1987); and transition radiation, M. A. Piestrup, D. G. Boyers, C. I. Pincus, J. L. Harris, X. K. Maruyama, J. C. Bergstrom, H. S. Caplan, R. M. Silzer and D. M. Skopik, "Quasimmochromatic X-Ray Source Using Photoabsorption-Edge Transition Radiation", *Phys. Rev. A* 43, 3653–3661 (1991) and M. A. Piestrup, M. J. Moran, D. G. Boyers, C. I. Pincus, J. O. Kephart, R. A. Gearhart and X. K. Maruyama, "Generation of Hard X-Rays from Transition Radiation Using High-Density Foils and Moderate-Energy Electrons", *Phys. Rev. A* 43, 2387–2396 (1991). More speculative ideas include: inverse Compton scattering from interfering laser beams, M. Bertolotti and C. Sibilia, "Coherent $\gamma$-Ray Production", *J. Sov. Laser Res.* 6, 492–495 (1985) and M. Bertolotti and C. Sibilia, "Coherent $\gamma$ Radiation Production by Interaction Between a Relativistic Electron Beam and Two Interfering Laser Fields", *Phys. Rev. A* 26, 3187–3197 (December 1982); the induced annihilation of para-positronium atoms, Daniel M. Heffernan and Richard L. Liboff, "Induced Decay of Positronium and Grasers", *Int. J. Theor. Phys.* 22, 193–206 (1983); and the relativistic electron-positron "superpinch" of Winterberg, F. Winterberg, "Relativistic Electron-Positron Gamma Ray Laser", *Z. Naturforsch*, 41a, 1005–1008 (1986).

To date, none of the ideas proposed have theoretically been able to realistically generate high energy radiation in the desired range. For instance x-ray lasers have not been tunable to selected frequncies. Further, only relatively low energies have been achieved. Lasers for generating $\gamma$-rays are also not tunable, and none have been developed that have approached workability. Free electron lasers for generating x-rays require mirrors that are sufficiently reflective at the wavelength of x-rays that are to be emitted. Such mirrors have not yet been developed. These have not been demonstrated to be practical to date. Generating radiation by transition radiation does not produce monochromatic or tunable output. It requires accelerators with electron energy $E \geq 200$ MeV. Channeling radiation has an output power that is limited by heat deposited by an electron beam in the crystal, which is the source of the radiation.

OBJECTS OF THE INVENTION

Thus, the several objects of the invention include to provide an apparatus that is relatively compact in size for generating radiation that is: tunable within the x-ray range and throughout a region spanning multiple orders of magnitude in wavelength or energy; highly directional; and monochromatic; where the cost of the apparatus is not prohibitive for many applications.

BRIEF DESCRIPTION OF THE INVENTION

In a first preferred embodiment, the invention is an apparatus for generating radiation comprising: means for generating a beam of electrons; means for constraining the beam of electrons to travel in a substantially straight path over a predetermined distance; means for generating a standing wave of light; and means for causing the beam of electrons to pass through the standing wave of light during a portion of the straight path, thereby causing certain of said electrons to emit radiation. The standing wave of light is preferably generated by a continuous wave beam of light that is circulating in a power buildup cavity.

In another preferred embodiment, the invention is a method of generating radiation, the method comprising the steps of: generating a beam of electrons; constraining the beam of electrons to travel in a substantially straight path over a predetermined distance; using a continuous wave laser beam to generate a standing wave of light; and passing the beam of electrons through the standing wave of light during a portion of the straight path, thereby causing certain of the electrons in the beam to emit radiation.

The present invention is a new radiation-generating device and method referred to herein as the laser undulator x-ray source (LUXUS). A LUXUS is capable of generating a highly-directional, monochromatic beam of x-rays, which is continuously tunable over multiple orders of magnitude in photon energy. In the compact configuration discussed below, these photons have energies lying between 18 eV and 45 MeV when the electron accelerator energy is varied between 1 MeV and 50 MeV. Such a device can be made small enough to fit inside an area of fifteen feet by fifteen feet. Even higher energy photons can be generated by increasing the electron beam energy beyond 50 MeV. However, the synchrotron radiation losses within the accelerator increase so rapidly with electron energy that operation beyond 50 MeV is practical only if the machine is made much larger physically or the mean accelerator current is significantly reduced (see Table 1).

DETAILED DESCRIPTION OF PREFERRED EMBODIMENTS OF THE INVENTION

Figure 1:
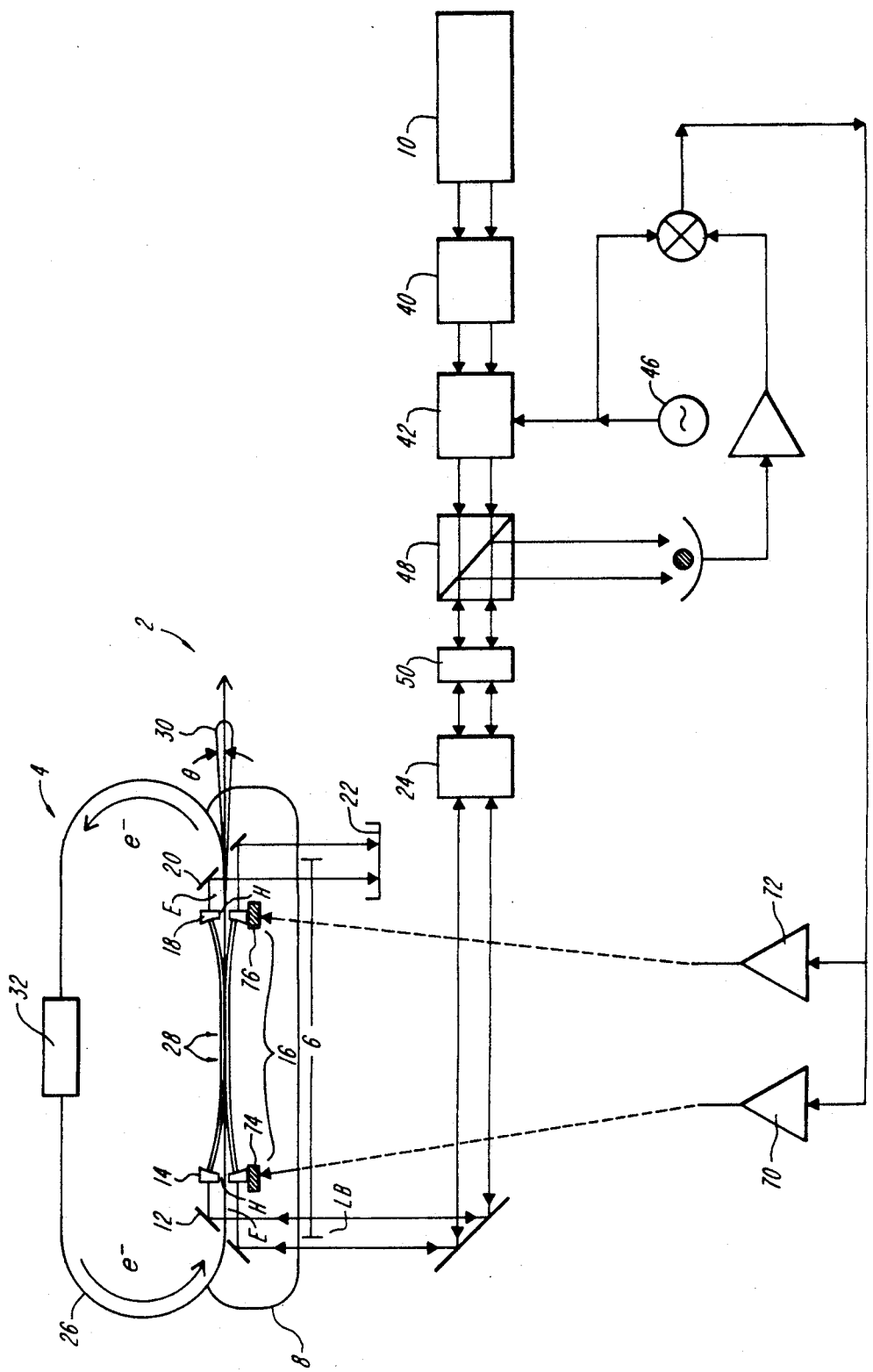
FIG. 1 is a schematic representation of the apparatus of the invention, showing an ultrastable, injection-locked laser source, a high-current, cyclic electron induction accelerator in the shape of a racetrack; a high-finesse Fabry-Perot resonator (with on-axis holes in the mirrors) used as a power buildup cavity; and the use of the Pound-Drever FM sideband technique to lock a resonant frequency of the resonator to the output frequency of the laser.

The laser undulator x-ray source apparatus 2, shown schematically in FIG. 1, includes: (a) a high-current, cyclic electron induction accelerator 4, which includes at least one straight section 6 (e.g., the lower side of the racetrack orbit as illustrated) in its orbital path; (b) a high-finesse Fabry-Perot resonator 16 used as a power-buildup cavity; and (c) a high-power, continuous wave, injection-locked Nd:YAG (neodymium:yttriumaluminum-garnet) laser 10 to which, in turn, the Fabry-Perot resonator 16 is locked. Other lasers are likely to be beneficially used, for instance a frequency-doubled Nd:YAG, a Ti:Al$_2$O$_3$ or a frequency-doubled Ti:Al$_2$O$_3$.

Figure 2:
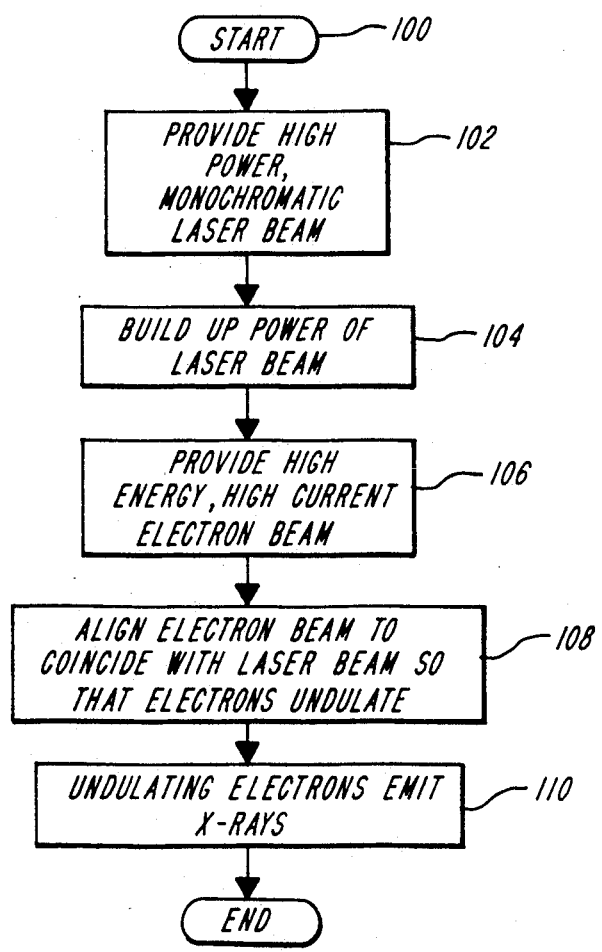
FIG. 2 is a flow chart showing the steps of a preferred embodiment of the method of the invention.

The general method of the invention is as follows, as illustrated in flowchart form in FIG. 2. The high power, extremely stable output from a laser is provided 102 to a buildup cavity, where it is reflected back and forth 104 so that the circulating power is very high, as described below. A beam of high energy electrons (between 1 MeV and 50 MeV) is provided 106 circulating around a course, arranged 108 so that the beam of electrons coincides with the reflecting laser beam over the course of approximately ten cm. Due to the reflecting laser energy, the electrons encounter an intense standing wave of electromagnetic radiation, which causes the electrons to undulate.

By "undulate," it is meant that the electrons do not follow a strictly straight path. They oscillate up and down (FIG. 7a) or from side to side (FIG. 7b), or they follow a helical path (FIG. 7c), depending on the polarization of the laser beam as they pass through the "undulator" region. Linear laser beam polarization leads to undulation in a plane. Circular polarization leads to the electrons following a helical path.

The undulation of the electrons causes them to 110 emit photons at x-ray wavelengths. This x-ray radiation is tunable, substantially monochromatic, and confined to a very small range of angles about the direction of motion of the electrons.

Thus, in its most general sense, the method of the invention is to provide a substantially continuous stream of energies of the required energy, with the electrons moving along a straight path for a predetermined portion of their travel. An intense region of standing electromagnetic light radiation is provided to coincide with the straight portion of the electron beam path. The interaction with the standing wave causes the electrons to undulate, which causes them to emit radiation. The invention does not require that a certain apparatus be used to generate the moving electrons, or the standing wave. Apparatus is discussed below which provides these conditions. However, the invention is not limited to such apparatus.

The operation of the LUXUS apparatus of the invention is as follows: A continuous wave beam of light coming from the laser 10, indicated by the two-headed parallel arrows LB, passes into vacuum chamber 8 (which is at a high vacuum) and is reflected by mirror 12, which has a hole in its center. The light beam then passes, in turn, through the glass substrate and dielectric coating of mirror 14 and so gains entrance to the Fabry-Perot cavity 16 delimited by mirrors 14 and 18. The mirrors 14 and 18 have the highest achievable reflectivity R and also have on-axis holes H which permit the transit of an electron beam E, as discussed below. For a discussion of resonators whose mirrors contain on-axis holes, see generally, M. Keselbrener, S. Ruschin, B. Lissak and A. Gover, "Numerical Studies of Resonators with On-Axis Holes in Mirrors for FEL Application", *Nucl. Instr. Meth. Phys. Res. A* 304, 782–785 (1991) and R. H. Pantell, J. Feinstein and A. H. Ho, "Interferometer Mirrors with Holes On-Axis", *Nucl. Instr. Meth. Phys. Res. A* 296, 638–641 (1990), which are both incorporated herein by reference.

As noted above, the mirrors 14 and 18 are both ultrareflective. Each consists, in general, of a glass substrate whose curved face has been covered by a multilayer dielectric coating. Initially, virtually all of the light which impinges on the rear surface of the dielectric coating of mirror 14 (after traversing the glass substrate of the same mirror) is reflected back—via mirror 12—toward laser 10. [Hence, the double-headed arrows indicating beam of light LB. Part of the reverse-traveling light is directed away from the laser 10 at polarizing beam splitter 48, as is described below. The remainder is absorbed in optical isolator 40.] As time passes, reflections are excited from each interface between adjacent layers in the multilayer dielectric coatings of both mirrors 14 and 18. After an elapsed characteristic time $t_c \sim 4FL/c$ [where F is the finesse discussed below, L is the resonator length and c is the speed of light in a vacuum], one finds in the space of the beam path on the laser side of mirror 12 an incident beam plus 2F interfering reflected beams. See generally, G. Cesini, G. Guattari, G. Lucarini and C. Palma, Response of Fabry-Perot Interferometers to Amplitude-Modulated Light Beams, *Optica Acta* 24, 1217–1236 (1977) and A. E. Dangor and S. J. Fielding, "The Response of the Fabry-Perot Interferometer to Rapid Changes in Optical Length", *J. Phys. D: Appl. Phys.* 3, 413–421 (1970). If one of the resonant frequencies of the cavity 16 coincides with the frequency of the light from laser 10, the interfering reflected beams will sum almost exactly to zero, so that thereafter the light incident on mirror 14 will be almost perfectly transmitted into the Fabry Perot resonator 16.

Thus, it is the fact that a continuous wave laser beam is used that permits use of the power build up cavity to build up power. If a pulsed laser were used, there would be no (or only limited) interference among the incident beam and the reflected beams on the laser side of mirror 14 and thus, the interfering reflected beams would never sum to zero. Therefore, nearly all of the incident energy in the pulse would be reflected, and power buildup would not be possible.

During the same characteristic time period, $t_c$, the circulating power inside the cavity 16 between highly reflective mirrors 14 and 18 builds up as more and more light enters the resonator cavity and ultimately achieves a maximum value which is limited by losses in the mirrors (including absorption and scattering inside the mirrors and transmission through them) and by diffraction losses within the cavity. The cavity configuration (i.e., sizes and shapes of mirrors and spacing between them) can be chosen so that diffraction losses are small compared with the mirror losses. As equilibrium is approached, the sum total of (a) the transmitted power, which is directed by reflection from mirror 20 to the laser beam dump 22 and (b) the total power lost to absorption and scattering inside the mirrors slowly approaches the incident power. In the process, the circulating power within the cavity attains a maximum value given by $$P_{circ} \approx \left(\frac{1+R}{1-R}\right) P_{inc} = PBF \cdot P_{inc}, \qquad (1)$$

where R is the reflectivity of the mirrors and PBF is the power buildup factor of the cavity (G. W. Chantry, "The Use of Fabry-Perot Interferometers, Etalons and Resonators at Infrared and Longer Wavelengths—An Overview", *J. Phys. E: Sci. Instr.* 15, 3–8 (1982)).

In a resonator whose mirrors are without on-axis holes, a PBF of 10,000 to 20,000 is easily achieved. For a PBF of this order or larger to be achieved in the resonator of FIG. 1, it is necessary that at least three conditions be satisfied. First the linearly polarized $TEM_{00}$ mode issuing from the laser must be converted via beam shaping optical equipment 24 into a mode matching as closely as possible the lowest loss eigenmode of a Fabry-Perot cavity having on-axis holes in the mirrors. It is believed that such a mode is similar to the $TEM_{01}$* mode of a resonator without holes. Second, a resonant frequency of the cavity 16 must be kept locked to the output frequency of the laser 10 if any light at all is to enter the cavity through mirror 14. This locked state is maintained in a preferred embodiment by using the Pound-Drever FM sideband technique, as discussed below and as indicated in FIG. 1. See generally R. W. P. Drever, J. L. Hall, F. V. Kowalski, J. Hough, G. M. Ford, A. J. Munley and H. Ward, "Laser Phase and Frequency Stabilization Using an Optical Resonator", *Appl. Phys. B* 31, 97–105 (1983) for a discussion of the Pound-Drever technique, which is incorporated herein by reference. Third, the mirrors with the on-axis holes must have extremely high reflectivity and must also have optimally chosen size, shape, and spacing in order to minimize cavity diffraction losses.

Figure 7A:
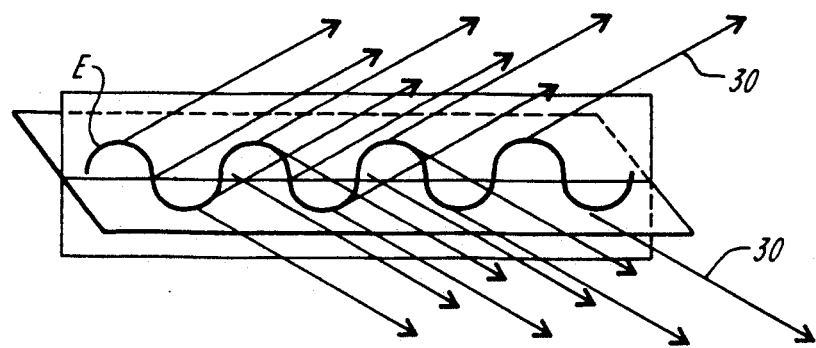
FIG. 7a is a schematic representation showing an electron undulating in a vertical plane (i.e., moving along a sinusoidal path in a vertical plane).
Figure 7B:
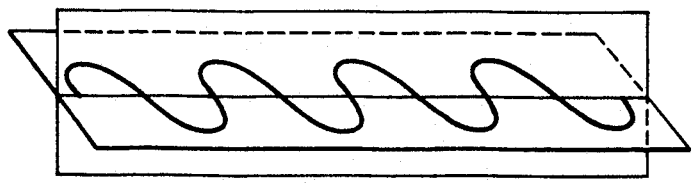
FIG. 7b is a schematic representation showing an electron undulating in a horizontal plane (i.e., moving along a sinusoidal path in a horizontal plane).
Figure 7C:
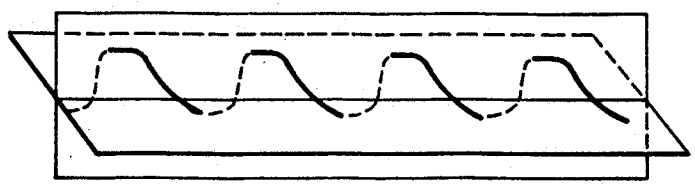
FIG. 7c is a schematic representation of an electron moving along a helical path.

Once the high-current electron induction accelerator 4 is set into operation, a uniform, (substantially) continuous beam of electrons circulates in a counter-clockwise direction as shown in FIG. 1 around the racetrack path 26. As the individual electrons travel between mirrors 14 and 18, they pass through a short region 28 referred to herein as the "undulator region," which is symmetrically located about the point midway between the two mirrors 14 and 18. In this undulator region, the electrons encounter an extremely intense standing wave of electromagnetic (laser) radiation, which causes the electrons to undulate and to emit a highly directed beam 30 of photons into a cone having a very small half-angle $\theta$ about the forward direction. As shown in FIGS. 7a, 7b and 7c, the undulation can be planar, helical or something more general, depending on the polarization of the laser beam.

Figure 3:
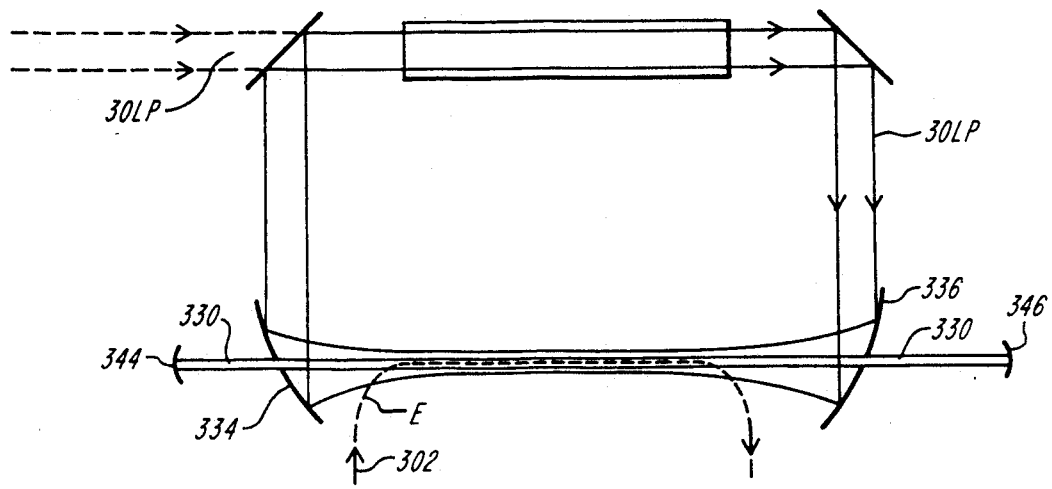
FIG. 3 is a prior art free electron laser.

It should be noted that the operation of LUXUS is based upon incoherent undulator emission by spontaneously-emitting electrons. This differs significantly from the so-called "stimulated" emission of free electron lasers. A prior art apparatus for producing x-rays by means of the stimulated emission of free electrons is illustrated in FIG. 3 (derived from J. GeaBanacloche, G. T. Moore, R. R. Schlicher, M. O. Scully and H. Walther, "Soft X-Ray Free-Electron Laser With a Laser Undulator", *IEEE J. Ouant. Electr.* QE-23, 1558-1570 (September 1987)). The prior art device causes bunches of high energy electrons 302 to pass through a powerful, counterpropagating pulse 30LP of laser light. This is distinguished from the invention, among other reasons, because the invention employs a standing wave of electromagnetic radiation generated by a continuous laser beam and a power buildup cavity. The invention is also beneficially used with a substantially continuous beam of electrons, although it can also be implemented with a bunched beam of electrons.

The electron bunches are deflected into, and later out of, coincidence with one side of the laser resonator by means of strong bending magnets (not shown). The distance between electron bunches is chosen to ensure that each bunch passes through the undulator region between mirrors 334 and 336 at the same time that the laser pulse passes through in the opposite direction. The laser pulse revolves in a clockwise fashion about the rectangular ring resonator shown and is amplified, once per revolution, as it passes through a powerful amplifier (symbolized by a piece of gain material at the top of the resonator) located inside the resonator. The amplification is required to compensate for the losses sustained by the laser pulse as a consequence of scattering and absorption inside the four mirrors, diffraction around them, and also leakage through the central holes in mirrors 334 and 336.

When the first electron bunch passes through the undulator region, the strong electromagnetic field of the counterpropagating laser pulse causes the electrons to undulate and to emit x-rays spontaneously. (Although the "stimulated" emission of free electrons here under discussion exhibits an initial "spontaneous" emission of photons, the principal mode is stimulated emission.) These x-rays or photons pass through the hole in mirror 336, reflect from mirror 346 and then proceed to bounce back and forth between mirrors 344 and 346, which delimit the x-ray resonator. As the second and successive bunches of electrons pass through the undulator region, the electrons feel not only the strong electromagnetic field of the counterpropagating laser pulse but, in addition, the electromagnetic field of previously emitted x-rays circulating in the x-ray resonator between mirrors 344 and 346. The presence of these x-ray fields causes the undulating electrons in succeeding bunches to emit more radiation (stimulated emission) than they would in the absence of such stimulating fields (spontaneous emission only).

The above-described technique does not work in practice because there are, at x-ray frequencies higher than the very lowest, no mirrors 344, 346 sufficiently reflective to bring such a free electron laser above the threshold for lasing. An additional serious problem is that the laser pulse amplifier lies within the light path inside the ring resonator. Such placement inevitably leads to very high losses which need to be made up by supplying enormous amounts of power to the laser amplifier.

The present invention relies upon spontaneous emission only to generate x-rays; it therefore requires no x-ray resonator. In addition, the use of a power buildup cavity with extremely high finesse allows one to substantially reduce the laser power requirements.

The following section outlines several important relationships and then focuses on each of the major components of the invention. Realization of high power output from LUXUS takes advantage of the following three components: (a) high-current, cyclic induction accelerators disclosed by Christos A. Kapetanakos and Phillip Sprangle, "Ultra-High-Current Electron Induction Accelerators", *Phys. Today* 38, 58-69 (February 1985), (b) ultrareflective mirrors, disclosed by G. Rempe, R. J. Thompson, H. J. Kimble and R. Lalezari, "Measurement of Ultralow Losses in an Optical Interferometer", *Opt. Lett.* 17, 363-365 (1 March 1992) and (c) ultrastable lasers with extremely narrow linewidths (of the order of 1000 Hz or less) disclosed by David Shoemaker, Alain Brillet, C. Nary Man, Olivier Cregut and Graham Kerr, "Frequency-Stabilized Laser-Diode-Pumped Nd:YAG Laser," *Opt. Lett.* 14, 609-611 (15 June 1989) and Ch. Salomon, D. Hils and J. L. Hall, "Laser Stabilization at the Millihertz Level", *J. Opt. Soc. Am. B* 5, 1576-1587 (August 1988).

Undulator Design Equations

The wavelength $\lambda$ of the undulator radiation emitted at the fundamental frequency into the direction $\theta$ by an electron passing through a counterpropagating pulse of circularly polarized laser radiation is given in general by the undulator equation (see generally, Brian M. Kincaid, "A Short-Period Helical Wiggler as an Improved Source of Synchrotron Radiation", *J. Appl. Phys.* 48, 684-2691 (July 1977) and Tsumoru shintake, Sazuo Huke, Jiro Tanaka, Isamu Sato and Isao Kumabe, "Development of Microwave Undulator", *Japan. J. Appl. Phys.* 22, 844-851 (May 1983), both of which are incorporated herein by reference), $$\lambda = \frac{\lambda_u}{2\gamma^2} [1 + K^2 + \gamma^2\theta^2], \tag{2}$$

where:
$\lambda_0$ = laser wavelength;
$\lambda_u$ = undulator period length $\sim \lambda_0/2$ (a distance);
$\theta$ = angle of photon emission with respect to direction of electron motion;
$\gamma = E/mc^2$ (and E = total energy of electron);

$$K = \frac{eB\lambda_u}{2\pi mc^2},$$

the "undulator parameter" (dimensionless) where $$e = \text{the charge on an electron;} \tag{3}$$

$$= 0.934 \times 10^{-4} B(G)\lambda_u(\text{cm});$$

-continued $$B = \text{rms magnetic field of laser beam;} \quad (4)$$

$$= \left(\frac{4\pi S}{c}\right)^{\frac{1}{2}} \text{ (and } S = \text{rms power density of the laser beam).}$$

(The equations of motion are simpler in the circular case. If the laser beam has linear polarization, then the electrons undulate in a plane.)

If the undulator parameter $K<<1$ (as will always be the case for LUXUS), then virtually all the radiation emitted will be emitted at the fundamental frequency and there will be only minimal harmonics. Furthermore, the radiation will have a maximum spectral purity and directionality given by the following equations (See generally, David Attwood, Klaus Halbach and Kwang-Je Kim, "Tunable Coherent X-Rays", *Science* 228, 1265–1272 (14 June 1985)):

$$\left(\frac{\Delta\omega}{\omega}\right) \sim \frac{1}{N} \quad (5)$$

$$\Delta\theta \sim \frac{1}{\gamma\sqrt{N}} \quad (6)$$

where:

$$\frac{\Delta\omega}{\omega} =$$

full spontaneous fractional frequency width at half maximum of undulator radiation emitted on-axis, with $\omega$ equal to the mean frequency of undulator radiation, and $\Delta\omega$ equal to the bandwidth in frequencies emitted by the undulating electrons;

$\Delta\theta$ = number of periods in the undulator, where L = the undulator length.

The limits given by Equations (5) and (6) will be achieved, however, only if the electron beam satisfies the following equations (See Attwood et al., cited immediately above):

$$\left(\frac{\Delta E}{E}\right)_e < \frac{1}{N} \quad (7)$$

$$\Delta\theta_e < \frac{1}{\gamma\sqrt{N}} \quad (8)$$

where $$\left(\frac{\Delta E}{E}\right)_e =$$

fractional energy spread of electron beam; and
$\Delta\theta_8$ = mean angular divergence of electron beam.

Finally, the mean power (in Watts) emitted by an undulator is given by:

$$P(W) = 0.127 \, E^2(\text{GeV}) \, \overline{B}^2(\text{kG}) \, L(\text{cm}) \, I(A). \quad (9)$$

where
L = undulator length and
I = mean electron beam current through undulator.
(D. F. Alferov, Yu. A. Bashmakov and P. A. Cherenkov, "Radiation from Relativistic Electrons in a Magnetic Undulator", *Sov. Phys. Usp.* 32, 200–227 (March 1989)).

Turning now to the major components of a preferred embodiment of the apparatus of the invention, the high current, cyclic electron induction accelerator 4 will be examined. According to Equation (9), the undulator output power P(W) is directly proportional to the mean electron beam current I through the undulator. To generate high power x-ray output, it is important to achieve the highest possible mean current in the accelerator. Synchrotrons, a class of cyclic electron accelerator generally characterized by constant radius acceleration by means of electric fields inside resonant radio frequency cavities, are limited by the beam breakup instability mode to mean currents not exceeding approximately 100 mA. By contrast, the modified betatron accelerator (MBA) built under the direction of Christos Kapetanakos at the Naval Research Laboratory in Washington, DC has already demonstrated a mean current exceeding 1000 A at an electron energy of 22 MeV. See generally, T. J. Smith, J. Golden and C. A. Kapetanakos, "Studies of Synchrotron Radiation Emission from the Modified Betatron Accelerator", *J. Appl. Phys.* 69, 6836–6843 (15 May 1991) and C. A. Kapetanakos, P. Sprangle, D. P. Chernin, S. J. Marsh and I. Haber, "Equilibrium of a High-Current Electron Ring in a Modified-Betatron Accelerator", *Phys. Fluids* 26, 1634–1648 (June 1983). (This information has been supplemented with a private communication from Dr. Kapetanakos.) However, the modified betatron is not suitable for use in LUXUS because its circular orbit cannot be modified to a racetrack configuration, which is the simplest configuration permitting the Fabry-Perot laser resonator to be brought into coincidence with the electron beam path.

However, the rapid electron beam accelerator (referred to as a "rebatron"), described in D. Dialetis, S. J. Marsh and C. A. Kapetanakos, "Analysis of the Acceleration Process in a Rebatron", *Part. Accel.* 21, 227–257 (1987), P. Sprangle and C. A. Kapetanakos, "Beam Trapping in High-Current Cyclic Accelerators with Strong Focusing Fields", *Part. Accel.* 18, 203–213 (1986) and C. A. Kapetanakos, P. Sprangle, S. J. Marsh, D. Dialetis and C. Agritellis, "Studies of a Rapid Electron Beam Accelerator (Rebatron)", *Part. Accel.* 18, 73–99 (1985), which are all three incorporated fully herein by reference, can be constructed in a racetrack configuration. One of the designers (Kapetanakos) has stated that the rebatron could achieve a mean current of 1000 A at energies up to 1 GeV. Electrons inside a rebatron can be accelerated to 1 GeV in just 5–10 $\mu$s. Such rapid acceleration has the very desirable effect of significantly reducing the sensitivity of the electron beam to various instabilities, field errors, etc.

In a rebatron, the energy required to accelerate the electrons is supplied to the accelerating gap inside the accelerating module 32 by a pair of convoluted parallel transmission lines. Since the electric field across the gap alternates between accelerating and decelerating, the electron beam within a rebatron is constrained to fill exactly one-half of the racetrack orbit. Thus, as compared to a beam of bunched electrons, such as are produced by electron storage rings, a rebatron produces a substantially continuous electron beam. In the apparatus of the invention, the electrons will emit radiation while they are in the undulator region. Therefore, if the undulator region is occupied for one-half the time, x-rays will be emitted for one-half the time. If the undulator region is occupied for more time, then x-rays will be emitted for more time. If the undulator region is occupied with electrons for less time, then x-rays will be emitted for less time. Typical applications of the invention are best served by production of x-rays over a substantially continuous time, i.e., at least one-half the time. However, there may be applications for which use can be made of radiation which is generated at other than a uniform rate with respect to time. Such applications would include those where a target is irradiated, and then examined by other means before the subsequent irradiation of the target. Such an apparatus is also within the contemplation of the invention, as defined by the attached claims.

Beam confinement and control are achieved by a combination of three magnetic fields: a vertical field to confine the beam to the racetrack shaped orbit and a combination of an external toroidal field and a strong focusing torsatron field to control the minor cross-section of the beam within the vacuum chamber. The rebatron is intrinsically a compact machine. The rebatron with dimensions of 2 m × 0.67 m (consisting of 1.33 m long straight sections bounded by semicircular end caps having 0.33 m radius of curvature) shown schematically in FIG. 1 was originally designed for a maximum electron energy of 10 MeV. A rebatron capable of a final energy of 50 MeV would be only slightly larger.

Turning now to the Fabry-Perot resonator 16 used as a power buildup cavity as stated at the beginning of the previous section, Equation (9) shows that the undulator output power varies directly as the mean electron beam current I through the undulator region 28. The same equation, when supplemented by the result of Equation (4), shows that the undulator power is also directly proportional to the rms power density, $\bar{S}$, of the laser beam LB within the undulator region 28. For the power buildup cavity 16 to make the maximum possible contribution to the x-ray output power of LUXUS, it is important to: (a) use beam shaping optical apparatus 24 that minimize cavity injection loss (i.e. losses due to reflection of incident beams before ever entering the buildup cavity 16); (b) spread the laser beam power over the largest possible annular region on the mirrors 14 and 18 (consistent with a maximum diffraction loss to be tolerated within the cavity) and then employ the maximum laser power allowed by mirror damage thresholds with respect to mirrors 14 and 18; (c) maximize the power buildup factor by minimizing mirror losses and diffraction loss within the cavity; and (d) reduce the diameter of laser beam LB throughout the undulator region 28 to the smallest value consistent with the general requirement that the diameter of the laser beam LB in this region always be larger than that of the electron beam E.

Assuming that one wishes an intracavity laser beam having mirror spot sizes of 1 cm or larger and a waist size of 0.1-1 mm (the latter dimensions dictated by the fact that Kapetanakos theorizes that an electron beam diameter as small as 0.1 mm is achievable in a rebatron (personal communication))a near-concentric configuration is chosen as a first approximation, to the optimum resonator. A near-concentric configuration has extremely small diffraction losses (of order $10^{-5}$ to $10^{-6}$) provided that the Fresnel number, NF, is chosen to be of order 1000. See generally, Herwig Kogelnik and T. Li, "Laser Beams and Resonators", *Appl. Opt.* 5, 1550-1567 (October 1966) and Salvatore Solimeno, Bruno Crosignani and Paolo DiPorto, *Guiding, Diffraction and Confinement of Radiation* (Academic Press, New York, 1986), Sec. VII-15. It should be noted that the resonator configuration which gives the optimum distribution of power density (with regard to uniformity and strength) throughout the undulator region will involve the use of aspheric mirrors.

Figure 6A:
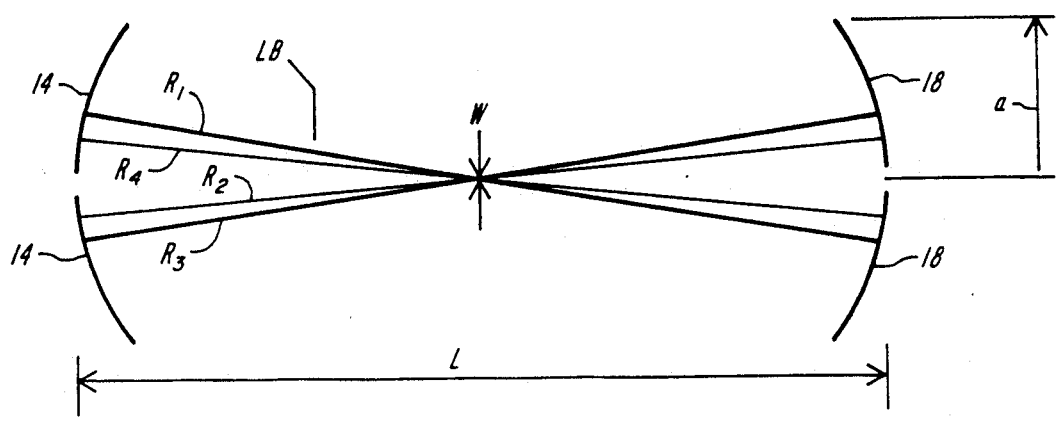
FIG. 6a is a schematic representation of a concentric resonator (diffraction ignored).

The Fresnel number, $N_F$, is a number related to the relative dimensions of the resonator and to the wavelength of the radiation resonating therein. We have $$N_F = \frac{a^2}{\lambda L},$$

where
- $a$ = the radius of mirrors 14 and 18, as shown in FIG. 6a and b;
- $L$ = the distance between centers of the mirrors 14 and 18; and
- $\lambda$ = the wavelength of the laser beam light LB.

To achieve a Fresnel number of the order of 1000 with $\lambda = 1.06$ μm and $L = 1$ m, the mirrors must have diameters of the order of 10 cm. PMS Electro-Optics of Boulder, CO manufactures ultrareflective mirrors consisting of a super-polished substrate of BK-7 glass covered by a forty-one-layer, quarter-wavelength, dielectric stack. The glass is a boro-silicate. The individual layers of the coating (or stack) have thicknesses of $\lambda/4n$ (where $\lambda$ = laser wavelength and n = index of refraction of a layer) and alternate between $SiO_2$ (silicon dioxide) and $Ta_2O_5$ (tantalum pentoxide). For such mirrors, designed for use at a wavelength of 0.852 μm, recent experiments (G. Rempe, R. J. Thompson, H. J. Kimble and R. Lalezari, "Measurement of Ultralow Losses in an Optical Interferometer, *Opt. Lett.* 17, 363-365 (1 March 1992)) have demonstrated a total fractional loss (total loss = absorption + scattering + transmission) of only 1.6 ppm, or equivalently, a reflectivity of R = 0.9999984. If used in a cavity which is so designed that the diffraction loss is much smaller than the mirror losses, such mirrors would permit the realization of a power buildup factor (see Equation (1)) exceeding $10^6$. Under such circumstances, it is necessary to take care that the resulting power density on the cavity mirrors not exceed the threshold for mirror damage. Little is currently known about the damage threshold of PMS mirrors illuminated by a high power, continuous wave laser beam of large cross section. However, experiments have been conducted in which small spots on PMS mirrors designed for use at $\lambda = 0.543$ μm were illuminated at high power density inside a vacuum chamber. At a pressure of $10^{-6}$ Torr and a power density of 500 KW/cm$^2$, no mirror damage of any kind was observed. Furthermore, virtually no heat buildup was observed in the mirror. Because much larger spots are beneficially illuminated for practice of the present invention, care must be taken not to damage the mirrors.

It is well known that Fabry-Perot cavities with highly reflective mirrors have narrow transmission resonances, i.e. only light inside narrow bands of frequencies can enter and resonate within the cavity. Thus, to efficiently couple laser light into such a cavity, the linewidth of the incident beam, i.e., the bandwidth of frequencies that make up the beam, must be smaller than the width of the transmission resonance. Otherwise, much of the energy in the beam will be excluded from the cavity and will thus be wasted. (This is similar to matching impedances in connection with an electrical or mechanical system.) According to well-known theory, (see generally G. W. Chantry, "The Use of Fabry-Perot Interferometers, Etalons and Resonators at Infrared and Longer Wavelengths—An Overview", *J. Phys. E: Sci. Instr.* 15, 3-8 (1982) and W. T. Welford, *Optics* (Oxford University Press, New York, 1988), Ch. 6, which are incorporated herein by reference) the power buildup factor ("PBF"), finesse, free spectral range ("FSR"), and transmission resonance width $\Delta v$ of a Fabry-Perot cavity are given, respectively, by $$PBF = \frac{1+R}{1-R} \quad (10)$$

$$\text{Finesse} \sim \frac{\pi \sqrt{R}}{1-R}$$

$$FSR = \frac{c}{2L}$$

$$\Delta v = FSR/\text{Finesse}$$

where L=length of cavity. The finesse of a cavity is a measure of the period of time during which light will reflect back and forth in the cavity before being extinguished. It is thus a measure of the duration of "ringing" in the cavity (not a measure of the time for a beam to go from one end of the cavity to the other). The free spectral range of a cavity is the distance in frequency space between adjacent resonances of the cavity ((longitudinal modes). For L=1 m and R=0.99999, then PBF $\sim 2 \times 10^5$; Finesse $\sim 314,000$; FSR=150 MHz; and $\Delta v$=150 MHz /314,000 $\sim$ 500 Hz. Thus, an ultrastable laser with a very narrow linewidth is very important, if not absolutely necessary.

Turning now to the high power, continuous wave, injectionlocked laser, the laser 10 chosen to provide the power for the power buildup cavity 16 should fulfill a number of conditions to achieve maximum benefit. First, the wavelength of the emitted radiation LB must lie in a region in which it is possible to construct mirrors 14 and 18 having extremely low losses. Since mirror losses typically rise steeply in both the ultraviolet and far infrared, a laser which emits in either the visible or near infrared is preferred. Second, the laser must be capable of producing an output that is both ultrastable and extremely narrow in linewidth. Third, and finally, the laser should emit the highest possible continuous wave power and be as efficient as possible in its use of primary power.

At the present time, the best fit to the above conditions is the Nd:YAG laser, although frequency-doubled Nd:YAG, Ti:Al$_2$O$_3$ and frequency-doubled Ti:Al$_2$O$_3$ are likely to emerge as the laser sources of choice.(S. T. Yang, C. C. Pohalski, E. K. Gustafson, R. L. Byer, R. S. Feigelson, R. J. Raymakers and R. K. Route, "6.5-W, 532-nm Radiation by CW Resonant External-Cavity Second-Harmonic Generation of an 18-W Nd:YAG Laser in LiB$_3$O$_5$", *Opt. Lett.* 16, 1493-1495 (1 October 1991)); T. L. Boyd and H. J. Kimble, "Frequency Stabilization of a Continuous-Wave Ti:Sapphire Laser", *Opt. Lett.* 16, 808-810 (1 June 1991) and A. Sanchez, R. E. Fahey, A. J. Strauss and R. L. Aggarwal, "Room-Temperature ContinuousWave Operation of a Ti:Al$_2$O$_3$ Laser", *Opt. Lett.* 11, 363-364 (June 1986)). [This prediction derives from the following facts. First, replacement of the Nd:YAG laser in LUXUS by a frequency-doubled Nd:YAG laser ($\lambda$=0.532 $\mu$m) would permit a $(1.064/0.532)^{\frac{1}{2}}$ =1.414-fold reduction in the electron energy required for generation of x-rays of a given energy (see Equation (2)). Second, the use of a Ti:Al$_2$O$_3$ laser, which is tunable throughout a useful waveband of 0.2 $\mu$m centered on 0.8 $\mu$m, would permit both a reduction in electron energy and the introduction of fine-tuning of the x-ray photon energy. Thus, for example, one could choose $\lambda$ =0.8 $\mu$m (which would allow a $(1.064/0.8)^{\frac{1}{2}}$ =1.15-fold reduction in electron energy) and then fine-tune the output x-ray energy by varying the laser wavelength slightly about this value. This, of course, would be done after coarse-tuning the output x-ray photon energy by adjusting the electron energy. This fine-tune capability is potentially valuable in certain applications. See Table 2.] However, a Nd:YAG laser pumped by diodes has an extremely high wall-plug efficiency exceeding 6 percent. See Santanu Basu and Robert L. Byer, "Average Power Limits of Diode-Laser-Pumped Solid State Lasers", *Appl. Opt.* 29, 1765-1771 (20 April 1990).

Figure 4:
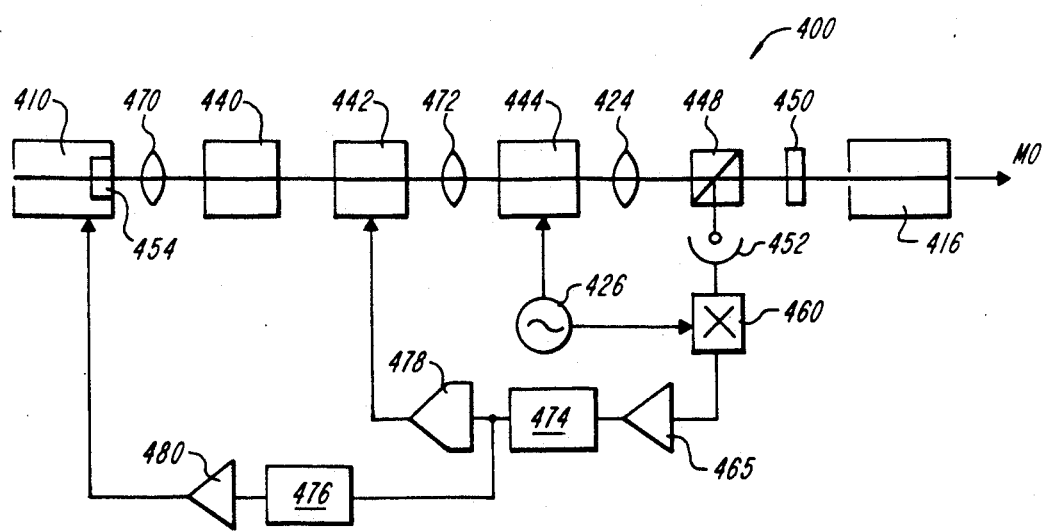
FIG. 4 is a schematic representation of a first stage use of the Pound-Drever technique to construct an ultrastable low-power master oscillator.
Figure 5:
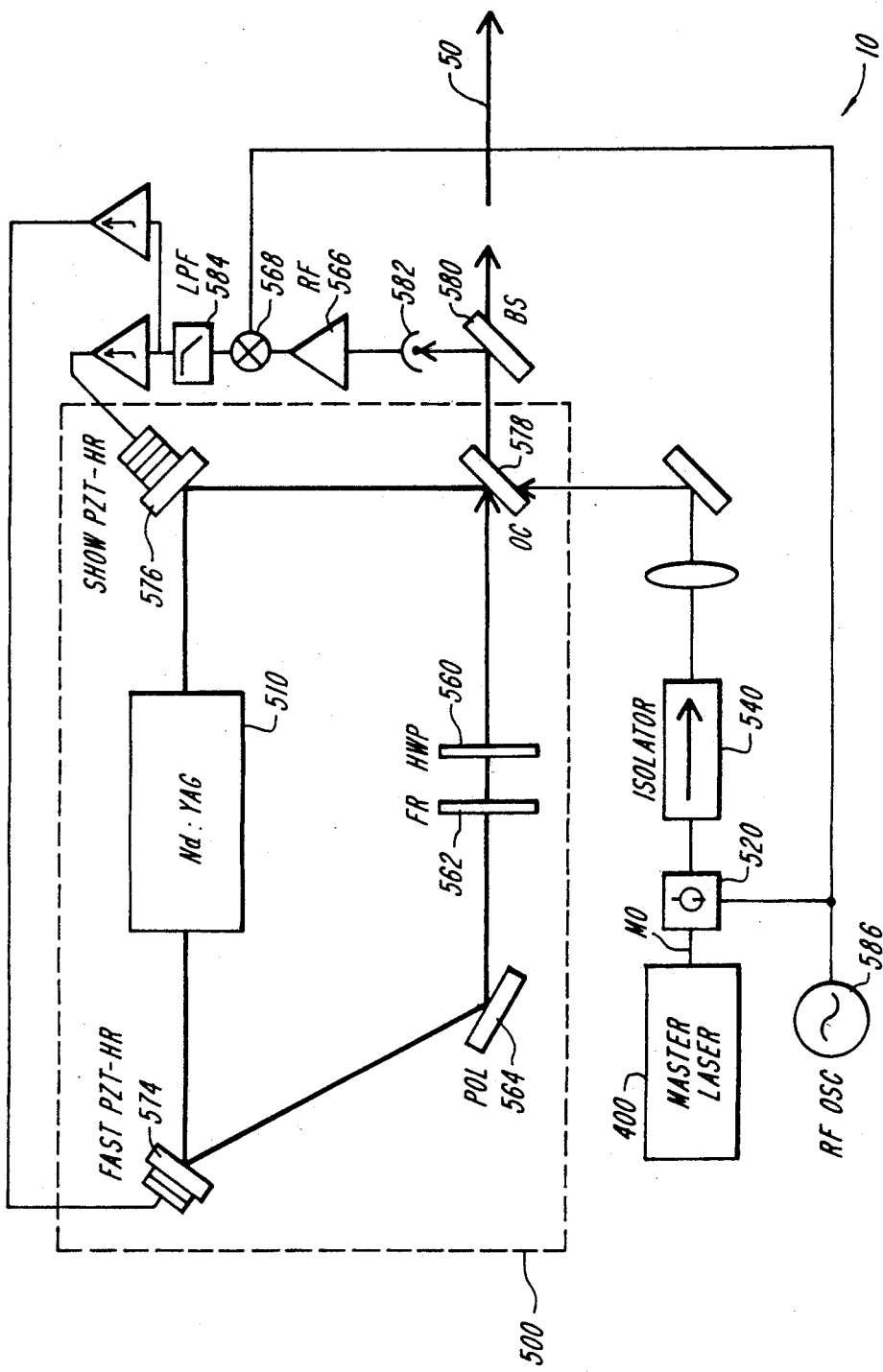
FIG. 5 is a schematic representation of a second stage use of the Pound-Drever technique to injection-lock a high-power slave ring resonator to the low-power master oscillator. The extremely high level of stability of the master oscillator is transferred to the high-power slave.

The high power, high quality laser radiation required by the power buildup cavity 16 is obtained as follows according to a preferred embodiment of the invention. However, the invention in its most general form includes any apparatus which delivers to Fabry-Perot cavity 16 a high power ultrastable, narrow-linewidth laser beam, which has the proper wavelength and mode structure to match the lowest order eigenmode of the cavity. Reference will be to FIGS. 1, 4 and 5. In general, in a first stage, an ultrastable, low power laser is provided. In a second stage, the ultrastable laser is amplified in such a manner that the amplified beam is also ultrastable and extremely narrow in linewidth.

First, a Nd:YAG master oscillator 400 (FIG. 4) capable of supplying a relatively low power beam, (e.g., 20 to 100 mW) of ultrastable, narrow-linewidth radiation is realized by locking the output of a diode-pumped Nd:YAG laser 410 of similar power to an ultrastable Fabry-Perot reference cavity 416. See generally, J. Hough, D. Hils, M. D. Rayman, Ma L.-S., L. Hollberg and J. L. Hall, "Dye-Laser Frequency Stabilization Using Optical Resonators", *Appl. Phys. B* 33, 179-185 (1984) and David Shoemaker, Alain Brillet, C. Nary Man, Olivier Cregut and Graham Kerr, "Frequency-Stabilized Laser-Diode-Pumped Nd:YAG Laser" *Opt. Lett.* 14, 609-611 (15 June 1989), which are incorporated herein by reference. The necessary locking of the laser 410 to the Fabry-Perot reference cavity 416 is achieved by using the Pound-Drever FM sideband technique. See, generally, R. W. P. Drever, J. L. Hall, F. V. Kowalski, J. Hough, G. M. Ford, A. J. Munley and H. Ward, "Laser Phase and Frequency Stabilization Using an Optical Resonator", *Appl. Phys. B* 31, 97-105 (1983), which is incorporated herein by reference. (The power of this technique was demonstrated by Shoemaker et al. who built a Nd:YAG master oscillator for which a linewidth of 1 mHz was inferred. (David Shoemaker, Alain Brillet, C. Nary Man, Olivier Cregut and Graham Kerr, "Frequency-Stabilized Laser-Diode-Pumped Nd:YAG Laser" *Opt. Lett.* 14, 609-611 (15 June 1989)))

The ultrastable master oscillator 400 (FIG. 4), (an exemplar of which has been built by Shoemaker et al.) operates in the following fashion. Light issuing from a low power Nd:YAG laser 410 passes through a matching lens 470 into a Faraday isolator 440, which is in essence an optical diode; it allows light to pass in one direction only (toward the right, as illustrated) and absorbs very strongly all light passing in the opposite direction. Such a component protects the laser 410 from reflections (traveling toward the left, as illustrated), which, if allowed to return to the laser, would defeat any attempt to stabilize it. The light leaving the isolator 440 passes through the acoustooptic modulator 442, which serves as a fast-frequency control element. The function of this component is described in greater detail below.

The laser light, assumed to have a frequency $\nu_0$, then passes through a matching lens 472 into an electro-optic modulator 444 which, using radio frequency energy supplied by RF oscillator 446, impresses 10 MHz FM sidebands onto the incident signal. The light which emerges from the electro-optic modulator 444 then consists of three sinusoidal components—a strong carrier wave at frequency $\nu_0$ and two much weaker sidebands at $\nu_0 +/-$ 10 MHz. The carrier and its two sidebands pass through matching lens 424 and polarizing beam splitter (Glan-Thompson or Glan-air polarizer) 448. Passage, without deflection, through beam splitter 448 requires that the incident light be polarized perpendicular to the plane of the figure; incident light polarized parallel to the plane of the figure is, on the other hand, deflected upward through roughly 90° with respect to the incident beam direction.

Assuming that the light issuing from laser 410 has perpendicular polarization, the three-component light beam which emerges from beam splitter 448 passes through a quarter-wave plate 450 and then strikes the entrance mirror (not individually shown) of the external, ultrastable Fabry-Perot reference cavity 416. The construction of ultrastable reference cavities is described in detail by J. Hough et al., "Dye-Laser Frequency Stabilization Using Optical Resonators," *Appl. Phys. B* 33, 179–1856 (1984), which is incorporated herein by reference. Since the linewidth of the cavity resonances of reference cavity 416 is assumed to be much narrower than 10 MHz, the two sideband components of the light beam (with frequencies $\nu_0 +/-$ 10 MHz) are completely reflected without phase change from the entrance mirror of reference cavity 416. If now, the frequency $\nu_0$ of the carrier frequency component of the incoming laser light differs from that, $\nu_{cav}$, of the nearest resonance of cavity 416 by an amount much smaller than the cavity resonance linewidth, then most of the incident light at frequency $\nu_0$ enters the reference cavity 416 and bounces back and forth between the mirrors many times before escaping through the exit mirror as the master oscillator output beam MO.

However, not all of the incident light at frequency $\nu_0$ enters the reference cavity 416 and then eventually leaves via the exit mirror. Rather, some part is directly reflected—without change in phase—from the entrance mirror. In addition, another part of the light, after resonating at frequency $\nu_{cav}$ inside the cavity 416, ultimately "leaks out" through the entrance mirror. The light moving leftward from the entrance mirror of cavity 416 therefore contains four components: (a) a carrier wave at frequency $\nu_0$ directly reflected without phase change; (b and c) two sidebands at frequencies $\nu_0 +/-$ 10 MHz, both reflected without phase change; and (d) a "leakage" component with frequency $\nu_{cav} \sim \nu_0$. These four components, after passing through the quarter-wave plate 450 for a second time (two passes through a quarter-wave plate are equivalent to a single pass through a half-wave plate), end up with polarization parallel to the plane of the figure; all four components therefore, while traversing beam splitter 448, are deflected downward to phase-sensitive detector 452. In the detector, the four components mix together. The two sidebands (b and c), serve as a "local oscillator".

The result of the mixing process is an electronic output signal having frequency components clustered about the frequency $\nu = 10$ MHz. Immediately thereafter, this output signal combines in the mixer 460 with the 10 MHz signal coming from RF oscillator 446 to produce a bipolar error signal (with frequency components now clustered about the frequency V=0), which is proportional to the frequency offset $\nu_0 - V_{cav}$.

By means of filtering through filters 474 and 476, the error signal is divided into two signals, with one containing the low frequency component of the error signal and the other the high frequency component. The low frequency signal is routed to piezoelectric transducer ("PZT") 454 upon which the exit mirror of laser 410 is mounted. Very small axial motions (<10 μm) of the PZT 454 lead to substantial changes in the laser output frequency $\nu_0$. The high frequency signal, when applied to acousto-optic modulator 442, produces fast but relatively small changes in the frequency of the light passing through the modulator. Thus, the slow response (low bandwidth) and high dynamic range of the PZT 454 combine with the fast response (high bandwidth) and low dynamic range of the acousto-optic modulator 442 to keep the output frequency, $\nu_0$, of the laser 410 exactly locked to one of the resonant frequencies $\nu_{cav}$, of reference cavity 416. The mathematical details of the above-described Pound-Drever FM sideband technique are discussed by Marie Houssin, Michele Jardino, Bruno Gely and Michel Desaintfuscien, "Design and Performance of a Few-Kilohertz-Linewidth Dye-Laser Stabilized by Reflection in an Optical Resonator," *Opt. Lett* 13, 823–825 (October 1988) and by Axel Schenzle, Ralph G. DeVoe and Richard G. Brewer, "Phase-Modulation Laser Spectroscopy,"]*Phys. Rev. A* 25, 2606–2621 (May 1982), both of which are incorporated herein by reference.

In general, the Pound-Drever technique as used herein and in the claims involves generating an error signal proportional to the difference between the frequency of the laser and a resonant frequency of the resonating cavity, by processing light which reflects and "leaks" from the entrance to the cavity, and using the error signal ultimately generated to alter either the frequency of the laser, or the resonant frequencies of the resonator or both, to eliminate the error. This technique is to be distinguished from other control techniques which ultimately derive the error signal from light transmitted through the cavity. It is not necessary to the invention that the Pound-Drever technique be used to lock the frequencies of the laser to the cavity, and any technique accomplishing such locking is within the scope of the attached claims. However, the Pound-Drever technique has been found to be an advantageous and flexible method of accomplishing the locking.

The stabilized master oscillator output MO from the Fabry-Perot cavity of master oscillator 400 is then injected into a slave cavity 500 (FIG. 5) capable of amplifying the beam MO and emitting a few hundred times more power than the master oscillator 400. The injection locking which is required to transfer the exquisite quality of the master oscillator beam MO to that of the slave SO is achieved in a preferred embodiment by again using the Pound-Drever technique, as illustrated in C. D. Nabors et al., "Injection Locking of a 13-W CW Nd:YAG Ring Laser," *Opt. Lett.* 14, 189-1191 (1 November 1989). See also U.S. Pat. No. 5,027,360, issued Jun. 25, 1991 to C. David Nabors and Robert L. Byer, for "High Power Continuous Wave Injection-Locked Solid-State Laser." Again, however, other methods of locking are within the scope of the invention.

The problem of injection-locking the slave cavity 500 (FIG. 5) to the ultrastable master oscillator 400 (FIG. 4) is very similar in principle to that of locking the output frequency of laser 410 to one of the resonant frequencies of the ultrastable external reference cavity 416. In both cases, the necessary locking is achieved by using the Pound-Drever technique to generate the required bipolar error signal. The principal difference lies in the nature of the frequency control elements to which the two components of the error signal are ultimately sent. In the case of the master oscillator of FIG. 4, the low and high frequency components of the error signal generated by the Pound-Drever discriminator are sent to PZT 454 (upon which the exit mirror of laser 410 is mounted) and to acousto-optic modulator 442, respectively. In the case of the slave oscillator of FIG. 5, however, the components of the error signal are sent to two PZTs 576 and 574, one slow and one fast, respectively. The slow PZT 576 has a low bandwidth ($\sim 1$ KHz) and large dynamic range ($\sim 10$ $\mu$m) while the fast PZT 574 has a high bandwidth ($\sim 100$ KHz) and a small dynamic range ($\sim 1$ $\mu$m). The combination of the motions of these two PZTs keeps the total length of the slave resonator adjusted so that the oscillation frequency of the slave laser coincides exactly with that of the master oscillator 400.

To be more specific, the injection-locking of the slave laser 500 is achieved as follows. Ultrastable light from master oscillator 400 passes through the electro-optic modulator 520 and, with the assistance of RF oscillator 586, acquires FM sidebands. The resulting three-component beam then passes through isolator 540 and finally strikes the beam splitter (output coupler) 578. If the output frequency of the master oscillator 400 is close enough to one of the resonant frequencies of the slave cavity, then most of the light incident on beam splitter 578 will enter the slave cavity 500 and begin to resonate in a counter-clockwise fashion, circulation in the clockwise direction being suppressed by the optical diode formed by the components half-wave plate 560, Faraday rotator 562 and polarizer 564.

The light which leaves beam splitter 578 and travels initially rightward (as illustrated in FIG. 5) contains, as in the case of FIG. 4, four components consisting of some carrier, two sidebands and a strong "leakage" component from the slave resonator. Most of this radiation passes through beamsplitter 580 and forms the output beam of the slave laser. A small part, however, is deflected toward phase-sensitive detector 582, where, as in FIG. 4, the four components mix, with the two sidebands once again serving as the "local oscillator." The electronic output signal is then mixed in mixer 568 with the signal coming from RF oscillator 586. The resulting bipolar error signal—once again proportional to the frequency offset $\nu - \nu_{cav}$—is then divided into low and high frequency components, which are sent to the slow and fast PZTs 576 and 574, respectively.

The net result of the above operations is the injection-locked Nd:YAG laser 10 of FIG. 1, which produces a continuous wave output of 15 W. See, in general, O. Cregut, C. N. Man, D. Shoemaker, A. Brillet, A. Menhert, P. Peuser, N. P. Schmitt, P. Zeller and K. Wallmeroth, "18 W Single-Frequency Operation of an Injection-Locked, CW, Nd:YAG Laser", *Phys. Lett. A* 140, 294-298 (2 October 1989), which is incorporated herein by reference, and which reported use of the Pound-Drever technique at two different levels to construct a Nd:YAG laser with 18 W of continuous wave, single-frequency output. The linewidth of the output radiation was not directly measured but was inferred by the authors to be extremely small.

To achieve a high power density in the Fabry-Perot power buildup cavity 16 of the embodiment of the invention shown in FIG. 1, the Pound-Drever FM sideband technique is used for the third and final time to adjust and lock one of the resonant frequencies of the Fabry-Perot cavity 16 to the output frequency of the injection-locked laser 10. Since the details of applying the Pound-Drever technique have been discussed previously, it suffices to identify the necessary components in FIG. 1. The optical configuration there includes an injection-locked laser 10, an optical isolator 40, an electro-optic modulator 42, a RF oscillator 46, a polarizing beam splitter 48, a quarter-wave plate 50 and beam-shaping optics 24. The beam shaping optics are required to convert the TEM$_{00}$ mode emitted by the laser into the lowest-order eigenmode of the power buildup cavity (delimited by mirrors 14 and 18), whose mirrors have on-axis holes.

The locking is accomplished by sending the dispersive shaped error signal ultimately generated by the Pound-Drever technique through separate fast 70 and slow 72 integrators. The processed signals are then passed along to piezoelectric transducers 74 and 76, upon which are mounted mirrors 14 and 18, respectively. The motions of transducer 74, which is capable of producing large-amplitude, slow axial motion of mirror 14, and transducer 76, which can produce small amplitude, fast axial motion of mirror 18, combine to change the length of the Fabry-Perot cavity 16 and to keep one of the resonant frequencies of the Fabry-Perot cavity 16 exactly locked to the stable output frequency of the laser. It is possible that it would be of advantage to replace the fast PZT by either an acousto-optic modulator (as in the master oscillator of Shoemaker et al.) or by an electro-optic modulator, as suggested by G. A. Kerr et al., "The Fast Frequency Stabilization of an Argon Laser to an Optical Resonator Using an Extra-Cavity Electro-Optic Modulator," *Appl. Phys. B* 37, 11-16 (1985).

The x-ray radiation generated by the apparatus of the invention, the LUXUS, has highly desirable properties. The mean power emitted by an undulator (such as the laser undulator contained in LUXUS) is given by Equation (9) above. For an embodiment where E=10 MeV, L=10 cm (inside a Fabry-Perot cavity 16 with total length=1 m, as shown in FIG. 1), and I=1000 A, the rms magnetic field $\overline{B}$ is determined as follows.

Figure 6B:
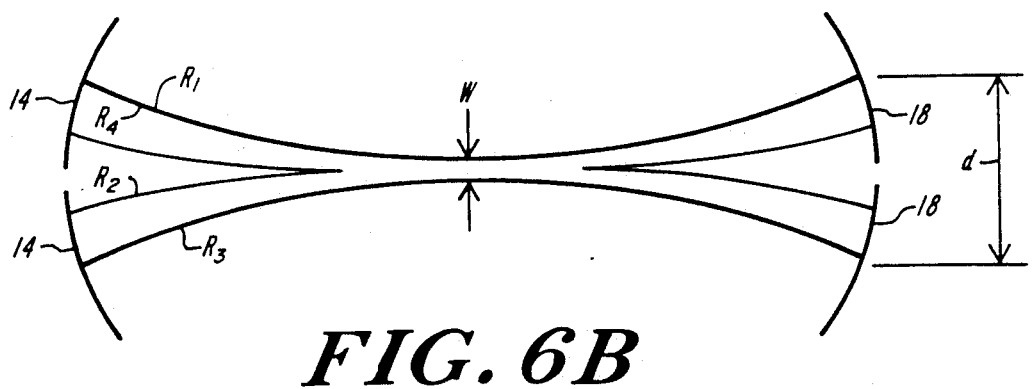
FIG. 6b is a schematic representation of a near-concentric resonator (diffraction included) used as a power buildup cavity.

Assume that fifteen watts of continuous wave, injection-locked power from the Nd:YAG laser 10, is injected into a Fabry-Perot resonator 16 having a power buildup factor of $2 \times 10^5$ and a geometry such that the cavity energy within the undulator region 28 is confined to a cylinder with a diameter of approximately 2 mm. This can be achieved with a near-concentric resonator configuration when the mirror spot diameter d is 2 cm (see FIG. 6b). The mean laser power density in the undulator region is then calculated to be $$\overline{S} = 15 \times (\tfrac{1}{2}) \times 2 \times 10^5 \ W/\pi(0.1)^2 \ cm^2 \sim 48{,}000 \ KW/cm^2.$$

[The factor of ½ in the preceding equation is required because of the two traveling-wave components which sum to the standing wave inside the Fabry-Perot resonator, only the component traveling counter to the direction of the electrons is effective in producing output x-rays. The other component makes only a negligible contribution.] See generally Tsumoru Shintake, Kazuo Huke, Jiro Tanaka, Isamu Sato and Isao Kumabe, "Development of Microwave Undulator", *Japan. J. Appl. Phys.* 22, 844–851 (May 1983). Note that the power density on the mirrors having a radius of 1 cm (as compared to the radius of the undulator of 1 mm) works out to about 1/100 of the power density in the undulator region, or 480 KW/cm², a figure slightly below the non-damaging power density of 500 KW/cm² mentioned above. Using Equation (4), one obtains $\overline{B} \sim 448$ G. If this quantity is now inserted into Equation (9) above along with the values given previously for E, L, and I, the power $P_x$ emitted by the undulator is:

$$P_x = 0.127(0.010)^2(0.448)^2(10)(1000)$$
$$= 25.5 \times 10^{-3} \ W.$$

The number of x-ray photons emitted per unit time ($N_x$) is obtained by dividing the output power of LUXUS by the x-ray photon energy; i.e., $N_x = P_x/E_x$. From Equation (2), the wavelength of the x-ray photons emitted by LUXUS is given by $$\lambda_x \sim \frac{\lambda_u}{2\gamma^2}(1 + K^2), \tag{11}$$

where $\lambda_u$ is the undulator period length and $\lambda = E/mc^2$. [For present purposes, the above approximation is sufficient since Eq. (16) implies that $$\gamma^2 \theta^2 < \frac{1}{N}.$$

For the LUXUS apparatus of the invention, it is always the case that $K \ll 1$. The x-ray photon energy, $E_x$, is then $$E_x = \frac{hc}{\lambda_x} \sim \frac{2hc}{\lambda_u(1+K^2)}\left(\frac{E}{mc^2}\right)^2. \tag{12}$$

Using Equation (9) and the preceding result, the number of x-ray photons emitted per unit time is:

$$N_x = \frac{P_x}{E_x} = 0.064 \frac{(mc^2)^2}{hc}[\lambda_u(1+K^2)\overline{B}^2 LI] \tag{13}$$

Inspection of Equation (13) shows that $N_x$ is independent of electron energy, $E_x$. For the case considered above ($P_x \sim 25.5 \times 10^{-3}$ W), $E_x = 1.792$ KeV and $N_x = 8.9 \times 10^{13}$ photons/s. Table 1 contains the result of calculations similar to those above for eight additional electron energies.

In the preceding paragraph, the x-ray power is that power emitted by the beam electrons as they pass through the laser undulator region within the Fabry-Perot resonator of LUXUS (See FIG. 1). The same electrons also emit synchrotron radiation as they move along the semicircular end caps of the racetrack orbit. The power radiated away as synchrotron radiation by a single electron while making a single revolution about a circle of radius $\rho$ is given by $$\Delta E(MeV) = 8.85 \frac{[E(GeV)]^4}{\rho(cm)}. \tag{14}$$

John D. Jackson, *Classical Electrodynamics* (John Wiley and Sons, Inc., New York, Second Edition, 1975), Eqs. (14.32) and (14.33). To simplify calculation, the configuration of FIG. 1 is assumed, where the racetrack accelerator orbit consists of 1.33 m long straight sections bounded by semicircular end caps having a radius of curvature of 0.33 m. The orbit circumference is 4.76 m. Setting, as previously, E = 10 MeV and also $\rho = 33$ cm, one easily obtains $\Delta E = 2.66 \times 10^{-3}$ eV. At the above beam energy, an accelerator with orbit circumference of 4.76 m operates at a frequency $$f = (3 \times 10^8 \ m/s)/4.76 \ m = 63.03 \ MHz.$$

At this frequency, a mean beam current of 1000 A implies a number of beam electrons, $N_o$, given by $$N_o = \frac{1000 \times 6.24 \times 10^{18}}{63.03 \times 10^6}$$
$$= 0.99 \times 10^{14} \ electrons$$

The emitted synchrotron power is then calculated to be $$P_{syn} = N_o f \Delta E \tag{15}$$
$$= 1.66 \times 10^{19} \ ev/s$$
$$= 2.66 \ W.$$

The result of the above calculation and those for eight additional electron energies are tabulated in Table 1. Since synchrotron radiation has an extremely broad spectrum, it is of interest to calculate a so-called critical energy, $E_c$, which is the energy beyond which there is negligible radiation emitted at any angle. According to Jackson (John D. Jackson, *Classical Electrodynamics* (John Wiley and Sons, Inc., New York, Second Edition, 1975), (14,85) and FIG. (14.11)), this energy is given by $$E_c = 3\left(\frac{E}{mc^2}\right)^3 \left(\frac{hc}{2\pi\rho}\right), \tag{16}$$

where h is Planck's constant and c is the speed of light. The above quantity was calculated for nine different electron energies in the configuration of FIG. 1; the results are listed in Table 1. From the synchrotron radiation power, $P_{syn}$, listed in Table 1, it is clear that operation of LUXUS at electron energies beyond 50 MeV will be practical only if: (a) the racetrack orbit is made much larger (thus increasing ($\rho$) or (b) the mean accelerator current is significantly reduced.

In addition to synchrotron and undulator radiation, there exists yet one more source of radiation from LUXUS. When during the course of injection into the accelerator, wayward electrons strike the walls of the accelerator, hard x-ray radiation called bremsstrahlung (Robley D. Evans, *The Atomic Nucleus* (McGraw-Hill, New York, 1955), Ch. (20) is generated. The photons emitted have a continuous spectrum which extends all the way up to the full energy of the incident electrons (up to a few hundred KeV). Such photons constitute by themselves a serious radiation hazard. A much greater hazard, however, arises from the bremsstrahlung generated at the time of electron beam dump, since such electrons may have (in LUXUS) energies up to 50 MeV. Clearly, LUXUS will require extensive radiation shielding to protect nearby personnel.

TABLE 1

| E (MeV) | $P_x$ (W) | $E_x$ (eV) | $P_{syn}$ (W) | $E_c$ (eV) |
|---|---|---|---|---|
| 1 | $2.55 \times 10^{-4}$ | 17.9 | $2.29 \times 10^{-4}$ | $1.34 \times 10^{-5}$ |
| 3 | $2.3 \times 10^{-3}$ | 161 | $2.12 \times 10^{-2}$ | $3.62 \times 10^{-4}$ |
| 10 | $2.55 \times 10^{-2}$ | $1.79 \times 10^3$ | 2.66 | $1.34 \times 10^{-2}$ |
| 30 | 0.23 | $1.61 \times 10^4$ | 215 | 0.36 |
| 43 | 0.47 | $3.32 \times 10^4$ (I-K) | 910 | 1.07 |
| 46 | 0.53 | $3.74 \times 10^4$ (Ba-K) | 1190 | 1.28 |
| 50 | 0.64 | $4.48 \times 10^4$ | 1663 | 1.68 |
| 100 | 2.55 | $1.79 \times 10^5$ | $2.66 \times 10^4$ | 13.4 |
| 1000 | 255 | $1.79 \times 10^7$ | $2.66 \times 10^8$ | $1.34 \times 10^4$ |

Table 1. LUXUS output, assuming parameters selected after Equation (14) above: E=electron energy, $P_x$=mean x-ray (undulator) output power, $E_x$=x-ray photon energy; $P_{syn}$=mean synchrotron radiation power and $E_c$=critical energy of synchrotron radiation. I-K=iodine K-edge, Ba-K=barium K-edge. In all cases above, $N_x = 8.9 \times 10^{13}$ photons/s.

The beam 30 of x-rays emitted by LUXUS has a spectral purity and a divergence which, under optimum conditions, are given by Equations (5) and (6) above. These equations require values for N, the number of periods in the undulator, and $\gamma = E/mc^2$, where E is the electron energy. For any undulator, the general relationship $N\lambda_u = L$ obtains, where L is the undulator length. Taking, as above, $L = 10$ cm, $\lambda_u \sim \lambda_0/2 \sim 0.53$ μm (assuming a Nd:YAG laser with $\lambda = 1.06$ μm) and $E = 10$ MeV, one finds $N \sim 1.9 \times 10^5$ and $\gamma = 19.6$. Inserting these parameters into Equations (5) and (6), one finds that the x-rays emitted by 10 MeV electrons passing through a 10 cm long Nd:YAG undulator have a spectral purity and divergence given, respectively, by $$\left(\frac{\Delta\omega}{\omega}\right) \sim 5.3 \times 10^{-6} \quad (17)$$

$$\Delta\theta \sim 1.2 \times 10^{-4} \quad (18)$$

However, as pointed out in connection with Equations (7) and (8), the optimum results above will be obtained only if the electron beam satisfies equally stringent conditions. In the present case, the following relations must obtain:

$$\left(\frac{\Delta E}{E}\right)_e < 5.3 \times 10^{-6} \quad (19)$$

$$\Delta\theta_8 < 1.2 \times 10^{-4} \quad (20)$$

Present induction accelerators, whether linear or cyclic, produce electron beams which typically have $$\left(\frac{\Delta E}{E}\right)_e \sim 10^{-2}$$

and $\Delta\theta_8 \sim 10^{-2}$.

With this less than ideal beam quality, the x-ray number flux previously calculated for LUXUS ($N_x \sim 8.9 \times 10^{13}$ photons/s) will not be drastically reduced when the non ideal nature of the electron beam is taken into account. Rather, approximately the same number of photons per unit time are produced but they are emitted into a larger solid angle and with a larger spread in energy. The present invention is not limited to the case where the ideal electron beam is used. The invention provides useful results even with the less than ideal electron beam. As accelerators with higher quality electron beams are developed, those of ordinary skill in the art will readily understand how to incorporate them into the LUXUS apparatus of the invention. [An electron beam with $\Delta\theta_e \approx 10^{-2}$ will not be good enough for use above with mirrors having electron transit holes just a couple of millimeters in diameter. Such a beam, in traveling the one meter distance between mirrors 14 and 18 (FIG. 1) would expand by more than a centimeter and then destroy the exit mirror. Because of this basic difficulty, it is much more important to minimize $\Delta\theta_e$ than it is to minimize $\Delta E_e$.]

To help determine the circumstances under which LUXUS would have an advantage over competing technologies, it is instructive to compare LUXUS with synchrotron radiation devices whose undulators employ the conventional permanent magnet technology. Compared are two radiation-generating machines, each representative of its undulator technology. Assume Machine 1 to be a LUXUS machine of the apparatus of the invention with a Nd:YAG standing wave laser undulator. As above, $\lambda_u \sim 0.53 \times 10^{-4}$ cm, $\bar{B} \sim 450$ G, $L \sim 10$ cm (giving $N = L/\lambda_u \sim 2 \times 10^5$), and $I = 1000$ A. From Equation (3), the undulator parameter is $K \sim 2.2 \times 10^{-6}$.

Machine 2 contains a conventional permanent magnet undulator with $\lambda_u \sim 3$ cm, $\bar{B} \sim 3,500$ G, $L \sim 300$ cm (giving $N \sim 100$), and $I \sim 0.1$ A. The undulator parameter is $K \sim 0.98$, which is within at most a factor of five (up or down) of the undulator parameter of every permanent magnet undulator in operation today (Xiaowei Zhang et al., "Construction and Performance of an X-Ray Undulator Beamline at the TRISTAN Accumulation Ring", *Rev. Sci. Instr.* 63, 404–407 (January 1992). See FIG. 2). The two machines are compared as follows:

(a) The apparatus of the invention requires significantly lower electron beam energy than conventional apparatus. From Equation (11), it is clear that the generation of an output x-ray photon of given energy $E_x$ requires a far higher electron beam energy in Machine 2 than in the LUXUS apparatus of the invention, because the undulator period length for Machine 2 is orders of magnitude larger than that for the apparatus of the invention. Setting $$\lambda_x \sim \frac{\lambda_{uL}}{2\gamma_L^2}(1 + K_L^2) = \frac{\lambda_{u2}}{2\gamma_2^2}(1 + K_2^2), \quad (21)$$

(where subscripts "L" indicate the apparatus of the invention, and subscripts "2" indicate Machine 2) and using data supplied above for $\lambda_u$ and K in the two machines, one finds that $\gamma_2 \sim 330 \, \lambda_L$. Thus, to generate narrow-band x-ray photons of a given energy $E_x$, Machine 2 requires an electron beam energy approximately 300 times higher than that required by the LUXUS apparatus of the invention. The above conclusion depends upon the tacit assumption that the output x-rays emitted by both machines are emitted only at the fundamental frequency (given by Equation (11)). This is indeed true for the LUXUS apparatus of the invention, since $K << 1$ implies that harmonic emission is negligible. For Machine 2, however, operation at K=1 leads to the emission of one-third of the total power at frequencies equal to harmonics of the fundamental (Peter Eisenberger and Michael Knotek, "Planning Study for Advanced National Synchrotron-Radiation Facilities", Department of Energy, Office of Basic Energy Sciences, 14 March 1984). Although these harmonics, in the ideal case, are smaller in amplitude and narrower spectrally than the fundamental line, once instrumental factors are taken into account the harmonics tend to become submerged in a quasi-continuum, leaving just the fundamental line with a narrow-band characteristic (see Xiaowei Zhang et al. above, and Pascal Elleaume, "Insertion Devices for the New Generation of Synchrotron Sources: A Review", *Rev. Sci. Instr.* 63, 321-326 (January 1992)). In more concrete terms, this means that the LUXUS apparatus of the invention will, at an electron beam energy of 30 MeV, generate narrow-band photons having the same energy $E_x$ as those (narrow-band photons) generated by Machine 2 at an electron beam energy of 9 GeV. The latter electron beam energy, it should be noted, exceeds that of all three of the third-generation synchrotron radiation facilities currently in either the planning or construction stage. These machines include the European Synchrotron Radiation Facility (ESRF; 6 GeV) in Grenoble, the Advanced Photon Source (APS; 7 GeV) at Argonne National Laboratory in Chicago, and the Super Photon Ring (Spring-8; 8 GeV) in Tokyo.

(b) The apparatus of the invention produces significantly better spectral purity of the output x-rays as compared to the conventional apparatus. According to Equation (5), the best possible spectral purity of the radiation emitted by an undulator is given by $$\left(\frac{\Delta\omega}{\omega}\right) \sim \frac{1}{N},$$

where N is the number of undulator periods. For the LUXUS apparatus of the invention, $N = 2 \times 10^5$ while for Machine 2, N=100. Thus, the LUXUS apparatus of the invention is intrinsically capable of achieving a spectral purity of its output radiation which exceeds that of Machine 2 by more than three orders of magnitude. A machine constructed on the model of Machine 2 could not achieve a spectral purity higher than that which has already been achieved. Conversely, LUXUS can achieve its maximum spectral purity, which is three orders of magnitude larger, if the quality of its electron beam is very high (albeit higher than is known to be currently achievable—see Equations (19)-(20)). In other words, any improvement in electron beam quality that may be accomplished in the future would result in no improvement in the spectral purity of x-ray output from Machine 2. However, improvement in electron beam quality would permit significantly better purity from LUXUS as compared to the best possible with Machine 2.

(c) The apparatus of the invention produces output x-rays having a very small angular divergence. The standing-wave laser undulator contained in the LUXUS apparatus of the invention has $K << 1$. According to Equation (6), such an undulator emits radiation into a cone having a (minimum possible) limiting half-angle $$\Delta\theta_L \sim \frac{1}{\gamma_L \sqrt{N_L}}.$$

However, an undulator (such as in Machine (2)) operated with $K \sim 1$ emits its radiation into a cone with a limiting half-angle which is characteristic of ordinary synchrotron radiation (see generally, Brian M. Kincaid, "A Short-Period Helical Wiggler as an Improved Source of Synchrotron Radiation", *J. Appl. Phys.* 48, 2684-2691 (July 1977) and David Attwood, Klaus Halbach and Kwang-Je Kim, "Tunable Coherent X-Rays", *Science* 228, 1265-1272 (14 June 1985)):

$$\Delta\theta_2 \sim \frac{1}{\gamma_2}.$$

But from paragraph (a) above, to achieve a given narrow band x-ray output energy $E_x$, Machine 2 must accelerate electrons to an energy roughly 300 times as high as that in LUXUS; i.e., $\gamma_2 \sim 300 \, \gamma_L$. After inserting $N_L = 2 \times 10^5$ and the preceding result into the expressions previously given for $\Delta\theta_L$ and $\Delta\theta_2$, it follows that:

For the LUXUS apparatus of the invention ($K << 1$):

$$\Delta\theta_L \sim \frac{1}{\gamma_L \sqrt{N_L}} \sim \frac{1}{450\gamma_L} \quad (22)$$

For Machine 2 ($K \sim 1$):

$$\Delta\theta_2 \sim \frac{1}{\gamma_2} \sim \frac{1}{300\gamma_L} \quad (23)$$

Thus, the two machines are ultimately capable of approximately the same directionality in their output radiation, with the apparatus of the invention capable of slightly better directionality.

(d) The apparatus of the invention is robust, being highly insensitive to small variations in $\overline{B}$ throughout the undulator region. According to Equations (2) and (3), the wavelength of the x-ray photons emitted at angle $\theta$ by an undulator is given by $$\lambda_x = \frac{\lambda_u}{2\gamma^2}(1 + K^2 + \gamma^2\theta^2), \quad (24)$$

where $$K = \frac{e\overline{B}\lambda_u}{2\pi m c^2}.$$

Assuming $\lambda_u$, $\lambda$ and $\theta$ fixed (i.e., allowing only $\overline{B}$ to vary), a straightforward calculation gives $$d\lambda_x = \frac{\lambda_u}{2\gamma^2}(2KdK) \qquad (25)$$

$$\left(\frac{d\lambda_x}{\lambda_x}\right) = \left(\frac{dK}{K}\right)\left[\frac{2K^2}{1+K^2+\gamma^2\theta^2}\right]$$

If $K \sim 1$, as in Machine 2, then a small change in K (or $\bar{B}$), e.g., 1%, will lead to a similar 1% change in the wavelength of the emitted x-rays. On the other hand, if $K \sim 2.2 \times 10^{-6}$ as in LUXUS, the same small percentage change in K (or $\bar{B}$) will result in an unobservable wavelength shift. In fact, even if the undulator parameter in the LUXUS apparatus of the invention is increased to $K = 10^{-3}$ (corresponding to a rms magnetic field $\bar{B} = 200,000$ G, which is not currently possible), a 1% change in K would still result in a relative wavelength change $<<10^{-5}$. Relative shifts in wavelength smaller than $10^{-5}$ are of no interest since, at best, $\Delta\omega/\omega \sim 10^{-5}$. It should be noted that even with $K < 10^{-3}$, the apparatus of the invention is not believed to be able to tolerate very large variations in $\bar{B}$ throughout the undulator region, e.g., $(\bar{B}_{max}/\bar{B}_{min}) = 10$ or 100. This is because the high directionality of the output x-ray beam (promised by Equation (6)) depends critically upon interference effects (Attwood et. al., cited above) which wash out if the fluctuations in $\bar{B}$ throughout the undulator region 28 are too large. Under such circumstances, the beamwidth increases and the spectral purity of the output radiation decreases.

(e) The apparatus of the invention compares favorably to the known technology in terms of the number flux, $N_x$. The number of photons of energy $E_x$ emitted per unit time by an undulator is given by Equation (13) as $$N_x \propto [\lambda_u(1+K^2)\bar{B}^2 LI],$$

where all parameters are as previously defined. Using the parameters given for LUXUS and Machine 2 after Equation (20), it follows that $$\frac{N_x(\text{Machine 2})}{N_x(\text{LUXUS})} = \qquad (26)$$

$$\left(\frac{3}{0.53 \times 10^{-4}}\right)\left(\frac{2}{1}\right)\left(\frac{3500}{450}\right)^2\left(\frac{300}{10}\right)\left(\frac{0.1}{1000}\right) \sim$$

$$2 \times 10^4.$$

From this relation, it is apparent that the apparatus of the invention shows an improvement over the prior art if any of the following obtain: if (i) the rms magnetic field strength $\bar{B}$ inside the undulator 28 of the LUXUS can be increased by orders of magnitude over that presently feasible; or (ii) the (potentially) much higher degree of spectral purity of LUXUS vis-a-vis Machine 1 is of importance; or (iii) a much lower number flux (or equivalently, power) is acceptable as the trade off for having a radiation-generating device which is very compact and which is roughly one hundred times less costly than a national facility such as the Advanced Photon Source at Argonne National Laboratory.

The above calculations give an accurate assessment of the situation at low output x-ray energies. The situation changes drastically when one reaches the region of medically-useful energies at 15–50 KeV (see Table 2).

To obtain narrow-band output x-rays in this energy range from Machine 2, input electron beam energies are required which are generally not available. Practitioners in need of x-rays in this energy range compromise and generate broad-band x-rays for which the contribution of the x-ray energy of interest has somehow been maximized. In practice, this is achieved (at an electron beam energy far lower than that calculated on the basis of the equation $\gamma_2 \sim 330 \gamma_L$), by using a wiggler rather than an undulator in Machine 2.

Although a wiggler is simply an undulator with $K >> 1$, the emission spectrum is typically nearly identical to that of the extremely broad spectrum of ordinary synchrotron radiation (see Sugiyama et al., "Design of 10-T Superconducting Wiggler for Angiography", *Rev. Sci. Instr.* 63, 313–316 (January 1992)). In applications requiring narrow-band x-rays, a comparison such as that in Equation (26) is meaningless since nearly all of the wiggler emission ends up being discarded. An example will suffice to illustrate the general situation. Researchers at both the Stanford Synchrotron Radiation Laboratory (SSRL) and at the National Synchrotron Light Source (NSLS) at Brookhaven National Laboratory have, for the past few years, been experimenting with digital subtractive angiography (one example of non-invasive medical dichromography—see Table 2), which is a technique for high contrast imaging of the cardiovascular system. Experiments show that successful digital subtractive angiography requires narrow-band x-rays having $\Delta\omega/\omega \sim 10^{-3}$ (Hideaki Shiwaku, Kazuyuki Hyodo, Xiao-Jing Wu, Shigeo Horiuchi and Masami Ando, "X-Ray Characterization of Lapped Si Surfaces for Coronary Angiography with 311 Reflection at 33.17 KeV", *Rev. Sci. Instr.* 63, 1201–1203 (January 1992)). Moderate quality 256×256 images have been obtained at SSRL using $\sim 2.6 \times 10^{11}$ photons/s in 1 second exposures (A. C. Thompson et al., "Imaging of Coronary Arteries Using Synchrotron Radiation", *Nucl. Instr. Meth. Phys. Res. B* 40/41, 407–412 (1989)). With 33 KeV/photon, this corresponds to a power of $1.4 \times 10^{-3}$ W. The power emitted by the 8-pole (N=8) wiggler used for the experiments, however, was well over a kilowatt. Thus, only $10^{-6}$ of the total emitted power was actually employed in making the images. At the NSLS at Brookhaven, high-quality images of the same Size have been obtained with a total of $3 \times 10^{12}$ photons/s in 1 second exposures (A. C. Thompson et al., "Transvenous Coronary Angiography Using Synchrotron Radiation", *Nucl. Instr. Meth. Phys. Res. A* 266, 252–259 (1988) and W. Thomlinson et al., "First Operation of the Medical Research Facility at the NSLS for Coronary Angiography", *Rev. Sci. Instr.* 63, 625–628 (January 1992)). These numbers should be compared with the $8.9 \times 10^{13}$ photons/s available from LUXUS.

The primary applications of the apparatus and method of the invention are identified in Table 2. The following points should be noted. First, the development and construction of a machine such as LUXUS should make it possible for small groups of researchers to do x-ray experiments which previously would have required use of rare and distant facilities. The most important applications will be those which require an x-ray beam having a substantial degree of monochromaticity. And second, the most important near-term application of the invention will be to medical radiography, including x-ray mammography, non-invasive medical dichromography, and general monochromatic radiology. It has been known for many years that every diagnostic x-ray imaging procedure has an associated optimum energy and that use of this energy in a monochromatic beam allows the realization of images with superior contrast and higher information content. A machine according to the invention could make available at many hospitals the benefits of imaging with a monochromatic, tunable x-ray beam.

TABLE 2

Uses for X-Rays Generated by LUXUS. $E_x$ = x-ray photon energy, E = accelerator electron energy, EXAFS = extended x-ray absorption fine structure, SEXAFS = surface EXAFS, and NEXAFS = near-edge EXAFS. Nd: YAGT laser undulator assumed.

Soft x-ray microscopy ($E_x$ = 0.2–0.6 KeV; E = 3.3–5.8 MeV)
Soft x-ray lithography ($E_x$ < 1.5 KeV; E < 9 MeV)
Manufacture of three-dimensional micro devices by LIGA process ($E_x$ > 2.5 KeV; E > 12 MeV)
(Deep-etch x-ray lithography + electroforming + molding)
Photoelectron diffraction ($E_x$ < 3 KeV; E < 13 MeV)
Determination of arrangement of surface atoms
Photoemission ($E_x$ < 3 KeV; E < 13 MeV)
Energy resolved
Angle resolved
Energy and angle resolved
Fundamental physics of photoionization
Bulk electronic states
Surface electronic states
Interface phenomena
X-ray absorption spectroscopy ($E_x$ < 20 KeV; E < 33 MeV)
Bulk (EXAFS)
Fluorescence
Surface (SEXAFS)
Photon induced desorption
Physics of near-edge phenomena (NEXAFS)
Proteins and enzymes
Amorphous materials
X-ray diffraction and scattering ($E_x$ < 20 KeV; E < 33 MeV)
Small-angle scattering
Large-angle scattering
Magnetic scattering
Anomalous scattering
Two-dimensional arrays
Protein crystallography
Amorphous materials
X-ray mammography ($E_x$ = 15-25 KeV; E = 29-37 MeV)
X-ray microprobe analysis ($E_x$ = 2-33 KeV; E = 11-43 MeV)
Detection of trace elements by means of fluorescence
Non-invasive medical dichromography ($E_x$ = 30-40 KeV; E = 41-47 MeV)
Contrast enhancement by digital subtraction of images above and below an absorption edge
Example 1: Iodine K-edge dichromography ($E_x$ = 33.16 KeV) for high-contrast imaging of the cardiovascular system
Example 2: Barium K-edge dichromography ($E_x$ = 37.44 KeV) for high-contrast studies of the gastrointestinal tract
Monochromatic medical radiography ($E_x$ < 50 KeV; E < 53 MeV)
Contrast enhancement resulting from use of tunable, monochromatic x-ray beam; higher information yield for given dose; also lower dose for given information
Detection of microflaws and radiation damage studies ($E_x$ > 1 MeV; E > 236 MeV)
Rocket casings
Nuclear reactor components
Nuclear physics ($E_x$ > 1.67 MeV; E > 305 MeV)
Studies of photonuclear reactions
Photoneutron source tunable in energy
Industrial processes involving radiation chemistry (such as polymerization) ($E_x$ = 1-2 MeV; E = 236-334 MeV)
Deactivation of long-lived isotopes form nuclear power plants ($E_x$ = 5-20 MeV; E = 528-1055 MeV)

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

For instance, it is not necessary to use the three stage Pound-Drever apparatus to achieve an ultrastable, high power laser output. Any technique that provides the required stability and power is within the contemplation of the invention. Further, it is not necessary to use a rebatron accelerator. Any means of deflecting a stream of high energy electrons of the desired distribution in space along a path that can be made to coincide with a laser beam in a recirculating path over the course of the required distance, such as, in this case, approximately 10 cm, is also within the contemplation of the invention. Further, it is not necessary that the electron accelerator be able to achieve electron energies of greater than 50 MeV. For compact implementations of the LUXUS apparatus, electron energies of >50 MeV are not useable unless the accelerator current is turned down, thereby reducing the power of the emitted radiation. However, the invention is beneficially useful even at power output levels that are less than the theoretical maximum.

Having described the invention, what is claimed is:

1. An apparatus for generating radiation comprising:
   a. means for generating a beam of electrons;
   b. means for constraining said beam of electrons to travel in a substantially straight path over a predetermined distance;
   c. means for generating a standing wave of light comprising:
      i. means for generating a substantially monochromatic, continuous wave beam of light;
      ii. an optical resonator used as a power build-up cavity; and
      iii. means for introducing said beam of light into said power buildup cavity; and
   d. means for causing said beam of electrons to pass through said standing wave of light during a portion of said straight path, thereby causing certain of said electrons to emit radiation.

2. The apparatus of claim 1, further comprising means for locking one of the resonant frequencies of said power buildup cavity to the frequency of said beam of light.

3. The apparatus of claim 2, said means for locking one of the resonant frequencies of said power buildup cavity to the frequency of said beam of light comprising:
   a. means for generating an error signal proportional to the difference between the frequency of the laser and one of the resonant frequencies of the power buildup cavity; and
   b. means for reducing the error signal to essentially zero.

4. The apparatus of claim 3, said means for reducing the error signal to essentially zero comprising means for changing the resonant frequencies of said power buildup cavity in response to said error signal.

5. The apparatus of claim 3, said means for reducing the error signal to essentially zero comprising means for changing the frequency of said laser in response to said error signal.

6. The apparatus of claim 1, said power buildup cavity comprising a pair of terminal mirrors, each symmetric about an axis, each mirror having an on-axis hole for the passage of said electron beam therethrough.

7. The apparatus of claim 6, said mirrors comprising spherical mirrors.

8. The apparatus of claim 6, said mirrors comprising aspherical mirrors.

9. The apparatus of claim 1, said means for generating said electrons comprising a rebatron.

10. The apparatus of claim 1, said means for generating a monochromatic, continuous wave beam of light comprising a laser.

11. The apparatus of claim 10, said laser comprising a stable output master oscillator, and means for stably amplifying said output.

12. The apparatus of claim 11, said means for amplifying said output of said master oscillator comprising a slave cavity injection-locked to said master oscillator so that the output of said slave cavity is a highly-stable amplified version of said output of said master oscillator.

13. The apparatus of claim 11, said master oscillator comprising a laser coupled to a reference cavity.

14. The apparatus of claim 4, said means for changing the resonant frequencies of said power buildup cavity comprising, connected to at least one of a pair of terminal mirrors, means for moving said mirror in response to said error signal.

15. The apparatus of claim 10, said laser comprising a Nd:YAG laser.

16. The apparatus of claim 10, said laser comprising a frequency doubled Nd:YAG laser.

17. The apparatus of claim 10, said laser comprising a Ti:Al$_2$O$_3$ laser.

18. The apparatus of claim 10, said laser comprising a frequency doubled Ti:Al$_2$O$_3$ laser.

19. A method of generating radiation, said method comprising the steps of:
  a. generating a beam of electrons;
  b. constraining said beam of electrons to travel in a substantially straight path over a predetermined distance;
  c. generating a standing wave of light by:
    i. generating a substantially monochromatic, continuous wave beam of light; and
    ii. introducing said beam of light into a power buildup cavity; and
  d. passing said beam of electrons through said standing wave of light during a portion of said straight path, thereby causing certain of said electrons in said beam to emit radiation.

20. The method of claim 19, said step of introducing said beam of light into a power buildup cavity comprising the step of locking one of the resonant frequencies of said power buildup cavity to the frequency of said beam of light.

21. The method of claim 20, said step of locking one of the resonant frequencies comprising the steps of:
  a. generating an error signal proportional to the difference between the frequency of the laser and one of the resonant frequencies of the power buildup cavity; and
  b. reducing the error signal to essentially zero.

22. The method of claim 21, said step of reducing the error signal to essentially zero comprising the step of changing the resonant frequencies of said power buildup cavity in response to said error signal.

23. The method of claim 21, said step of reducing the error signal to essentially zero comprising the step of changing the frequency of said beam of light in response to said error signal.

* * * * *